US010713709B2

(12) United States Patent
Glass et al.

(10) Patent No.: US 10,713,709 B2
(45) Date of Patent: Jul. 14, 2020

(54) PERSONALIZED WEBPAGE GIFTING SYSTEM

(71) Applicant: e2interactive, Inc., Atlanta, GA (US)

(72) Inventors: Brett R. Glass, Overland Park, KS (US); Nicole E. Glass, Overland Park, KS (US); Dominique Michelle Pierron O'Hara, Lenexa, KS (US); Elizabeth Ann Trimble, Overland Park, KS (US); Karl Joseph Geisler, Olathe, KS (US)

(73) Assignee: e2interactive, Inc., Atlanta, GA (US)

( * ) Notice: Subject to any disclaimer, the term of this patent is extended or adjusted under 35 U.S.C. 154(b) by 157 days.

(21) Appl. No.: 13/753,453

(22) Filed: Jan. 29, 2013

(65) Prior Publication Data
US 2013/0211970 A1 Aug. 15, 2013

Related U.S. Application Data

(60) Provisional application No. 61/592,320, filed on Jan. 30, 2012, provisional application No. 61/698,410, filed on Sep. 7, 2012, provisional application No. 61/737,729, filed on Dec. 14, 2012.

(51) Int. Cl.
G06Q 30/00 (2012.01)
G06Q 30/06 (2012.01)
(52) U.S. Cl.
CPC .................. G06Q 30/0641 (2013.01)
(58) Field of Classification Search
CPC ....................................... G06Q 30/00
See application file for complete search history.

(56) References Cited

U.S. PATENT DOCUMENTS

| 4,611,262 | A | | 9/1986 | Galloway et al. |
| 4,703,573 | A | | 11/1987 | Montgomery et al. |
| 5,063,698 | A | | 11/1991 | Johnson et al. |
| 5,251,251 | A | | 10/1993 | Barber et al. |
| 5,425,078 | A | | 6/1995 | Stern |
| 5,444,767 | A | | 8/1995 | Goetcheus et al. |
| 5,490,206 | A | | 2/1996 | Stern |
| 5,570,414 | A | | 10/1996 | Stern |
| 5,652,606 | A | | 7/1997 | Sasaki et al. |
| 5,719,920 | A | | 2/1998 | Harman |
| 6,085,242 | A | * | 7/2000 | Chandra ........... G06F 17/30887 707/E17.115 |

(Continued)

FOREIGN PATENT DOCUMENTS

EP       0596171 A1    5/1994

OTHER PUBLICATIONS

JibJab, "Valentines Day ECards", Jibjab.com, dated Dec. 2, 2011. (Year: 2011).*

(Continued)

Primary Examiner — Mark A Fadok
(74) Attorney, Agent, or Firm — Landmark Intellectual Property Law, PLLC

(57) ABSTRACT

A computer-implemented system for creating an enhanced online gifting experience that allows a purchaser to enter information identifying a gift recipient as well as text, sound, images or video relevant to the gift recipient and/or to an event. The system uses this information to create a personalized webpage identified and located via a personal uniform resource locator (PURL) associated with the gift recipient.

20 Claims, 29 Drawing Sheets

(56) References Cited

U.S. PATENT DOCUMENTS

| | | | |
|---|---|---|---|
| 6,192,407 B1* | 2/2001 | Smith | G06F 17/3089 707/E17.116 |
| 6,288,319 B1 | 9/2001 | Catona | |
| 6,356,626 B1 | 3/2002 | Ohara et al. | |
| 6,360,254 B1* | 3/2002 | Linden | G06F 17/30876 707/E17.112 |
| 6,487,599 B1* | 11/2002 | Smith | G06F 17/3089 707/E17.116 |
| 6,529,956 B1* | 3/2003 | Smith | G06F 17/3089 707/E17.116 |
| 6,573,880 B1 | 6/2003 | Simoni et al. | |
| 6,666,378 B2 | 12/2003 | Milton Davila et al. | |
| 6,850,248 B1 | 2/2005 | Crosby et al. | |
| 6,965,912 B2 | 11/2005 | Friedman et al. | |
| 7,127,841 B1 | 10/2006 | Weber | |
| 7,152,350 B2 | 12/2006 | Youngdahl et al. | |
| 7,203,287 B2 | 4/2007 | Turner et al. | |
| 7,222,797 B2 | 5/2007 | Milton Davila et al. | |
| 7,356,950 B1 | 4/2008 | Avery | |
| 7,359,954 B2 | 4/2008 | Friedman et al. | |
| 7,370,076 B2 | 5/2008 | Friedman et al. | |
| 7,478,143 B1 | 1/2009 | Friedman et al. | |
| 7,535,996 B2 | 5/2009 | Turner | |
| 7,606,857 B2 | 10/2009 | Friedman et al. | |
| 7,702,542 B2* | 4/2010 | Aslanian, Jr. | 705/14.73 |
| 7,711,620 B2 | 5/2010 | Abifaker | |
| 7,797,378 B2 | 9/2010 | Friedman et al. | |
| 7,953,654 B2* | 5/2011 | Abifaker | 705/35 |
| 7,959,065 B2 | 6/2011 | Rosenblatt et al. | |
| 7,967,215 B2 | 6/2011 | Kumar | |
| 7,975,927 B1 | 7/2011 | Whitney | |
| 8,011,122 B2 | 9/2011 | Clegg | |
| 8,046,266 B1 | 10/2011 | Geller | |
| 8,396,772 B2* | 3/2013 | Abifaker | 705/35 |
| 8,503,857 B2* | 8/2013 | Sikorski | H04N 5/765 386/224 |
| 8,577,735 B2* | 11/2013 | Wilen | B42D 15/045 705/26.1 |
| 8,860,865 B2* | 10/2014 | Dukellis | G06Q 30/0253 348/333.02 |
| 9,002,839 B1* | 4/2015 | Rospo | G06Q 30/0607 707/732 |
| 2001/0005834 A1* | 6/2001 | Simpson | G06Q 30/02 705/26.1 |
| 2001/0040560 A1 | 11/2001 | Amron | |
| 2001/0043164 A1 | 11/2001 | Thagard et al. | |
| 2001/0043194 A1 | 11/2001 | Amron | |
| 2002/0095677 A1* | 7/2002 | Davis | H04N 5/4401 725/46 |
| 2002/0116531 A1* | 8/2002 | Chu | G06Q 30/02 709/246 |
| 2002/0138573 A1* | 9/2002 | Saguy | G06Q 10/107 709/204 |
| 2002/0138843 A1* | 9/2002 | Samaan et al. | 725/87 |
| 2003/0001846 A1* | 1/2003 | Davis | G11B 27/031 345/474 |
| 2003/0033305 A1* | 2/2003 | O'Connor | G06Q 30/02 |
| 2003/0046150 A1* | 3/2003 | Ader | G06Q 20/123 705/14.67 |
| 2003/0192209 A1 | 10/2003 | Yeh | |
| 2004/0010550 A1* | 1/2004 | Gopinath | H04L 12/1813 709/205 |
| 2004/0150983 A1 | 8/2004 | Sexton et al. | |
| 2004/0167819 A1 | 8/2004 | Keating | |
| 2004/0205138 A1 | 10/2004 | Friedman et al. | |
| 2004/0217877 A1 | 11/2004 | Kokonaski et al. | |
| 2004/0248073 A1 | 12/2004 | Pinkerman et al. | |
| 2005/0004878 A1 | 1/2005 | Malone | |
| 2005/0228899 A1* | 10/2005 | Wendkos | H04L 12/585 709/232 |
| 2005/0246752 A1* | 11/2005 | Liwerant | G06Q 30/02 725/109 |
| 2005/0270280 A1 | 12/2005 | Riback et al. | |
| 2006/0015359 A1 | 1/2006 | Merritt | |
| 2006/0028951 A1* | 2/2006 | Tozun | G11B 3/64 369/84 |
| 2006/0134591 A1 | 6/2006 | Karat | |
| 2006/0184386 A1 | 8/2006 | Merritt | |
| 2007/0038577 A1 | 2/2007 | Werner et al. | |
| 2007/0038716 A1* | 2/2007 | Saguy | G06Q 30/02 709/206 |
| 2007/0080214 A1 | 4/2007 | Collas et al. | |
| 2007/0143133 A1 | 6/2007 | Velcoff | |
| 2007/0153638 A1 | 7/2007 | Lebbing | |
| 2007/0168237 A1* | 7/2007 | Campbell | G06Q 10/02 705/5 |
| 2007/0169387 A1 | 7/2007 | Glass | |
| 2007/0171278 A1 | 7/2007 | Chen | |
| 2007/0266413 A1* | 11/2007 | Davis | H04N 7/17318 725/100 |
| 2007/0282697 A1 | 12/2007 | Kirby | |
| 2007/0284269 A1 | 12/2007 | Star | |
| 2008/0099551 A1 | 5/2008 | Harper et al. | |
| 2008/0116088 A1 | 5/2008 | Roberts | |
| 2008/0119952 A1 | 5/2008 | Smith et al. | |
| 2008/0228597 A1* | 9/2008 | Sondles | G06Q 30/0277 705/14.73 |
| 2008/0289230 A1 | 11/2008 | Mandelbaum et al. | |
| 2008/0294977 A1* | 11/2008 | Friedman et al. | 715/224 |
| 2009/0027566 A1 | 1/2009 | Wargon | |
| 2009/0030694 A1 | 1/2009 | Stern | |
| 2009/0061901 A1* | 3/2009 | Arrasvuori | G06Q 30/00 455/456.3 |
| 2009/0125410 A1* | 5/2009 | Perlman | G06Q 30/0601 705/26.1 |
| 2009/0138396 A1 | 5/2009 | Boal | |
| 2009/0165343 A1* | 7/2009 | Miller | G06Q 30/02 40/124.06 |
| 2009/0171804 A1 | 7/2009 | Lee | |
| 2009/0177545 A1* | 7/2009 | Castineiras | G06Q 30/02 705/14.36 |
| 2009/0187491 A1 | 7/2009 | Bull | |
| 2009/0192928 A1* | 7/2009 | Abifaker | 705/35 |
| 2009/0211126 A1 | 8/2009 | Oh | |
| 2009/0216653 A1 | 8/2009 | Sanguinetti et al. | |
| 2009/0254453 A1 | 8/2009 | Sanguinetti et al. | |
| 2009/0238544 A1 | 9/2009 | Orsini | |
| 2009/0281794 A1 | 11/2009 | Avraham et al. | |
| 2009/0300475 A1* | 12/2009 | Fink | G06F 17/3082 715/230 |
| 2009/0327129 A1* | 12/2009 | Collas | G06Q 20/105 705/41 |
| 2010/0004935 A1* | 1/2010 | Wain | 704/272 |
| 2010/0005377 A1 | 1/2010 | Batan | |
| 2010/0011632 A1 | 1/2010 | Shields et al. | |
| 2010/0017278 A1* | 1/2010 | Wilen | B42D 15/045 705/14.2 |
| 2010/0050205 A1* | 2/2010 | Davis | G06Q 30/0603 725/32 |
| 2010/0052876 A1 | 3/2010 | Clegg | |
| 2010/0052934 A1 | 3/2010 | Clegg | |
| 2010/0089990 A1* | 4/2010 | Spaulding | B65D 27/04 229/301 |
| 2010/0121926 A1* | 5/2010 | Catalano | G06Q 10/10 709/206 |
| 2010/0174618 A1 | 7/2010 | Driessen | |
| 2010/0175287 A1 | 7/2010 | Gupta et al. | |
| 2010/0198678 A1* | 8/2010 | Burst | G06Q 30/0239 705/14.39 |
| 2010/0211448 A1* | 8/2010 | Beenau | G06Q 20/3829 705/14.23 |
| 2010/0250255 A1 | 9/2010 | Stern | |
| 2010/0299192 A1* | 11/2010 | Aslanian, Jr. | 705/14.5 |
| 2010/0333134 A1* | 12/2010 | Mudd | G06Q 30/02 725/32 |
| 2011/0004533 A1* | 1/2011 | Soto | G06Q 30/00 705/27.1 |
| 2011/0047182 A1* | 2/2011 | Shepherd | G06Q 10/10 707/780 |
| 2011/0054906 A1 | 3/2011 | Stern | |

(56) References Cited

U.S. PATENT DOCUMENTS

| | | | |
|---|---|---|---|
| 2011/0125607 A1 | 5/2011 | Wilen | |
| 2011/0210160 A1* | 9/2011 | Vantieghem | G11B 20/10 |
| | | | 229/68.1 |
| 2011/0218854 A1* | 9/2011 | Shamlian | G06Q 30/0251 |
| | | | 705/14.49 |
| 2011/0251962 A1* | 10/2011 | Hruska | 705/72 |
| 2011/0265136 A1* | 10/2011 | Liwerant | H04M 3/567 |
| | | | 725/112 |
| 2011/0271196 A1* | 11/2011 | Rakowski | H04L 12/58 |
| | | | 715/735 |
| 2011/0288978 A1* | 11/2011 | Abifaker | 705/35 |
| 2012/0022924 A1* | 1/2012 | Runnels | G06F 3/011 |
| | | | 705/14.4 |
| 2012/0209688 A1* | 8/2012 | Lamothe et al. | 705/14.27 |
| 2012/0226588 A1* | 9/2012 | Wuhrer | G06Q 30/06 |
| | | | 705/27.1 |
| 2013/0042169 A1* | 2/2013 | Reedy | G06Q 50/01 |
| | | | 715/202 |
| 2013/0046638 A1* | 2/2013 | Shepherd | G06Q 30/0251 |
| | | | 705/14.67 |

OTHER PUBLICATIONS

International Search Report and Written Opinion, PCT/US2013/023945, dated May 3, 2013, Personalized Gifting System.

\* cited by examiner

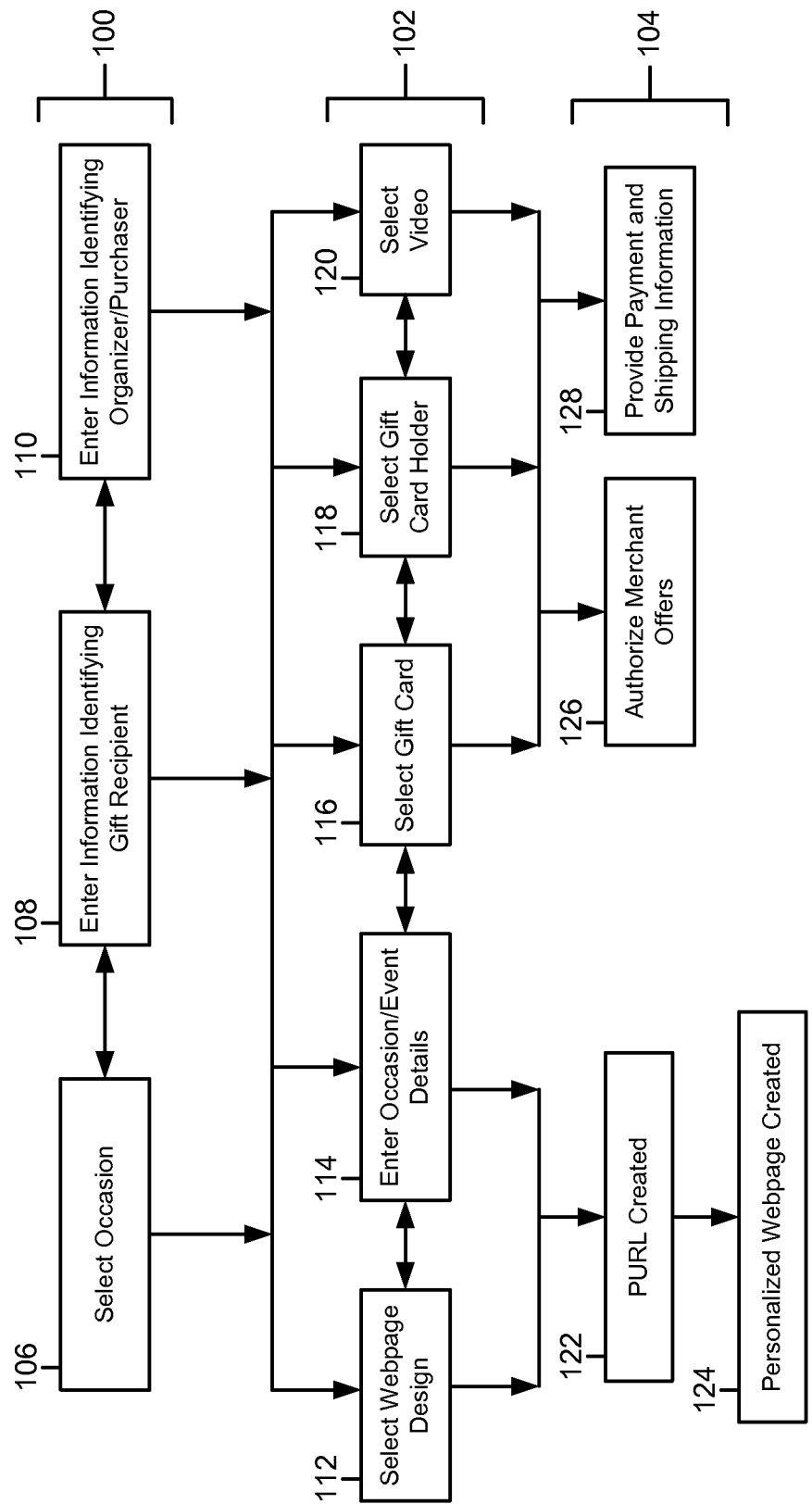

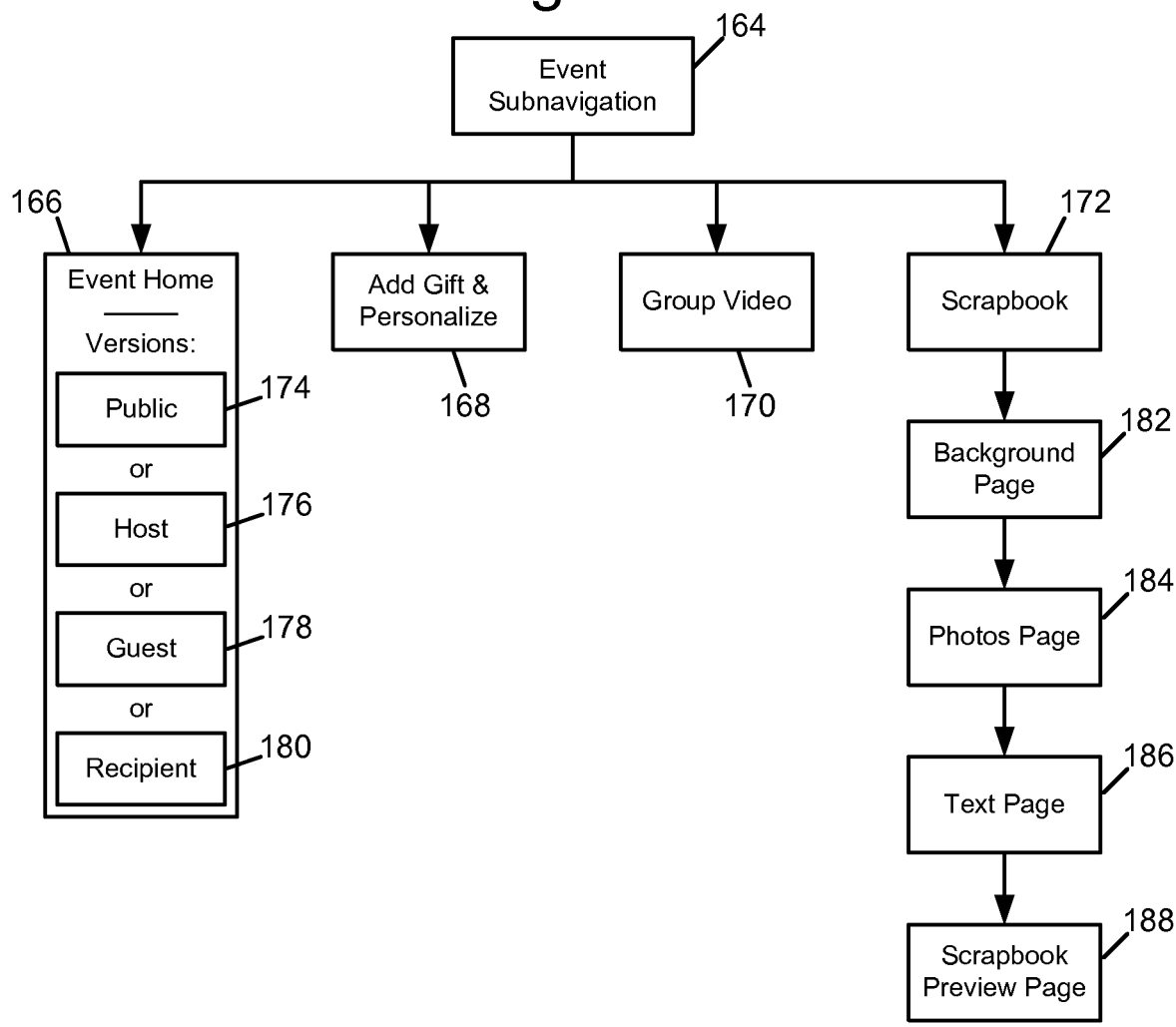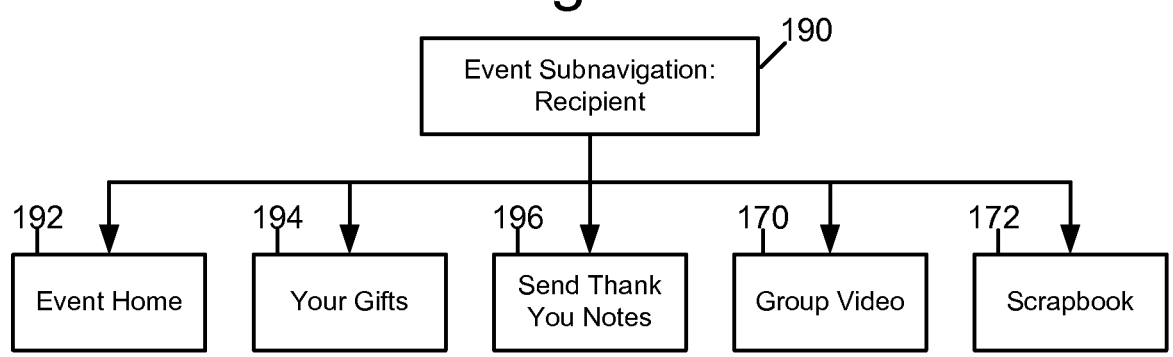

Fig. 2

Select Occasion
- Occasion 1
- Occasion 2
- Occasion 3
- Occasion 4
- Occasion 5

Fig. 3

Enter Information Identifying Gift Recipient
- Name
- Age
- Birth Date
- Gender
- Photo Interests/Preferences
- Shopping
- Dining
- Travel/Leisure

Fig. 4

Enter Information Identifying Organizer/Purchaser
- Name
- Phone Number
- E-mail Address
- Photo

Fig. 5

Select Design
- Design 1
- Design 2
- Design 3
- Design 4
- Design 5

Fig. 6

Select Gift Card
- Group or Individual
- Select Merchant
  - Merchant 1
  - Merchant 2
  - Merchant 3
- Amount
- Electronic or Physical

Fig. 7

Enter Occasion/Event Details
- Event Title
- Event Date
- Gift Cut Off Date

Fig. 8

Select Gift Card Holder
- Customizable Holder
- Occasion-Specific Holder
- Video Holder

Fig. 9

Select Celebration Video
- Yes/No

Send Notice Via
- Email
- Text/SMS/MMS
- Social Media

Browse and Select Video Templates
- Video 1
- Video 2
- Video 3

Fig. 18

| HOME | START THE OCCASION | OCCASIONS |
|---|---|---|

| | | | |
|---|---|---|---|
| GENERAL<br>ALL DESIGNS<br>FEATURED DESIGNS<br>NEW DESIGNS | BIRTHDAY | HOLIDAY | THANK YOU |
| SEASONAL<br>CHRISTMAS<br>HANUKKAH<br>VALENTINE'S DAY<br>EASTER<br>MOTHER'S DAY<br>FATHER'S DAY | CONGRATULATIONS | WEDDING | BABY |
| OCCASIONS<br>ANNIVERSARY<br>BABY<br>BACK-TO-SCHOOL<br>BIRTHDAY<br>BRIDAL<br>CONGRATULATIONS<br>GRADUATION<br>HOUSE WARMING<br>THANK YOU<br>WEDDING | | | |

Fig. 20

| HOME | START THE OCCASION | OCCASIONS |

| 1 CHOOSE DESIGN | 2 ENTER DETAILS | 3 ADD GIFT & CUSTOMIZE | 4 INVITE GUESTS |

TELL US ABOUT THE PARTY!

| | |
|---:|---|
| EVENT TITLE | [EVENT TITLE] |
| WHO ARE WE CELEBRATING? | [GUEST NAME]  ?????????GUEST OR RECIPIENT??? |
| EVENT TYPE | BIRTHDAY ▼ |
| EVENT DATE | [MM/DD/YEAR] |
| GIFT CUT-OFF DATE | [MM/DD/YEAR] |

UPLOAD GUEST PHOTO

WHO'S THE PARTY PLANNER?

| | |
|---:|---|
| HOST NAME | [YOUR NAME] |
| HOST PHONE | [###-###-####] |
| HOST E-MAIL | [_____@_____.___] |

UPLOAD HOST PHOTO

WHO'S THE LUCKY PERSON?   [GIFT RECIPIENT NAME]

WHAT DOES THE LUCKY RECIPIENT LIKE?   SHOPPING ▼   DINING ▼   TRAVEL/LEISURE ▼

ADDITIONAL INFORMATION FOR GUESTS

| GO BACK | SAVE EVENT | | NEXT |

Fig. 21

| HOME | START THE OCCASION | OCCASIONS |
|---|---|---|

| 1 CHOOSE DESIGN | 2 ENTER DETAILS | 3 ADD GIFT & CUSTOMIZE | 4 INVITE GUESTS |
|---|---|---|---|

SELECT GIFT CARD

ADD GIFT CARD?  ◉ YES  ○ NO

GROUP OR INDIVIDUAL GIFT CARD?  [GROUP ▼]

SELECT GIFT CARD BY MERCHANT  [MERCHANT 1 ▼]

| [GIFT CARD IMAGE] | AMOUNT | [$###.##] | ◉ ELECTRONIC GIFT CARD |
|---|---|---|---|
|  | CUT-OFF DATE | [MM/DD/YEAR] | ○ PHYSICAL GIFT CARD |

SELECT GIFT CARD HOLDER

| CUSTOMIZABLE GIFT CARD HOLDER | OCCASION-SPECIFIC GIFT CARD HOLDER | VIDEO GIFT CARD HOLDER | CELEBRATION VIDEO |
|---|---|---|---|

TEASER VIDEO

ADD TEASER VIDEO?  ◉ YES  ○ NO

SEND VIA  [E-MAIL ▼]  [___@___.___]

BROWSE VIDEOS  [CHOOSE FILE]  [VIDEO IMAGE]

[GO BACK]  [SAVE EVENT]                                    [NEXT]

Fig. 22

| HOME | START THE OCCASION | OCCASIONS |
|---|---|---|

| 1 CHOOSE DESIGN | 2 ENTER DETAILS | 3 ADD GIFT & CUSTOMIZE | 4 INVITE GUESTS |
|---|---|---|---|

CHECK OUT METHOD

SHIPPING INFORMATION

SHIPPING METHOD

PAYMENT INFORMATION

ORDER REVIEW

CHECKOUT PROGRESS

| BILLING ADDRESS | CHANGE |
|---|---|
| SHIPPING ADDRESS | CHANGE |
| SHIPPING METHOD | CHANGE |
| PAYMENT METHOD | CHANGE |

ORDER REVIEW

| ITEM DESCRIPTION | QTY | CARD VALUE | SUBTOTAL |
|---|---|---|---|
| GIFT CARD (MERCHANT 1) | 1 | $25.00 | $25.00 |
| VIDEO TEASER (VIDEO 1) | 1 | N/A | $00.99 |
| | | SUBTOTAL | $25.99 |
| | | TAX | $01.48 |
| | | TOTAL | $27.47 |

FORGOT AN ITEM?

EDIT ORDER

PLACE ORDER

DISCOUNT OR COUPON CODE

APPLY

GO BACK   SAVE EVENT                NEXT

[RECIPIENT GREETING, E.G. HAPPY BIRTHDAY]

10 OF YOUR CLOSEST FRIENDS ARE
CELEBRATING YOUR BIG DAY!

[EVENT CLOSURE NOTICE AND DATE, MAILING DATE]

PARTY PLANNER!

OPEN YOUR PRESENTS!

Fig. 27
[RECIPIENT GREETING, E.G. HAPPY BIRTHDAY]
CLICK TO VIEW CELEBRATION VIDEO
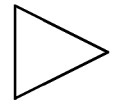
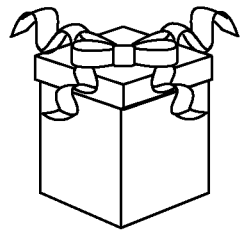
CLICK TO OPEN
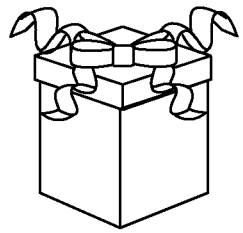
CLICK TO OPEN
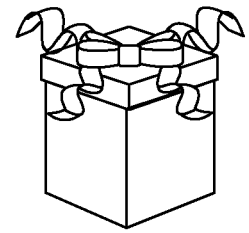
THIS GIFT WILL ARRIVE IN THE MAIL SOON!

[RECIPIENT GREETING, E.G. THE PARTY ISN'T OVER!]

[STATEMENT INTRODUCING MERCHANT OFFERS]

| MERCHANT 1 IDENTIFIER (TEXT AND/OR GRAPHIC) | MERCHANT 2 IDENTIFIER (TEXT AND/OR GRAPHIC) |

CHECK YOUR MAILBOX!

SPECIAL OFFER WILL BECOME AVAILABLE WHEN YOU RECEIVE THIS GIFT CARD IN THE MAIL ON [DATE SPECIFIED]

CLICK ON BRANDS TO EXPLORE OFFERS

Fig. 35

| HOME | START THE OCCASION | OCCASIONS |
|---|---|---|

| 1 EVENT SETUP | 2 ADD GIFT & CUSTOMIZE | 3 CHECKOUT | 4 INVITE GUESTS |
|---|---|---|---|

INVITE GUESTS

| ADD EMAIL ADDRESSES | ADD FROM SOCIAL MEDIA 1 | ADD FROM SOCIAL MEDIA 2 | ADD FROM SOCIAL MEDIA 3 |
|---|---|---|---|

"Add email addresses separated by commas or returns."

+ADD TO GUEST LIST

GUEST LIST

| NAME | EMAIL ADDRESS | EDIT/REMOVE |
|---|---|---|
| | | EDIT |

GO BACK | SAVE EVENT | NEXT

Fig. 36

| HOME | START THE OCCASION | | OCCASIONS |
|---|---|---|---|
| 1 EVENT SETUP | 2 ADD GIFT & CUSTOMIZE | 3 CHECKOUT | 4 INVITE GUESTS |

SCRAPBOOK

ACTIVATE SCRAPBOOK  ◉ YES   ○ NO

"Activate an online scrapbook that will allow you and guests to create pages by adding photos and messages to a digital scrapbook commemorating the event and adding to the celebration."

SELECT NOTIFICATIONS

○ NOTIFY USER WHEN A GUEST ADDS A GIFT CARD

○ NOTIFY USER WHEN A GUEST POSTS TO THE MESSAGE BOARD

○ NOTIFY USER WHEN A GUEST ADDS CONTENT TO THE GROUP VIDEO

○ NOTIFY USER WHEN A GUEST ADDS CONTENT TO THE SCRAPBOOK

SAVE

GO BACK  |  SAVE EVENT  |  NEXT

PERSONALIZED WEBPAGE GIFTING SYSTEM

CROSS REFERENCE TO RELATED APPLICATIONS

This application claims the benefit of the prior filed, provisional patent applications, Ser. No. 61/592,320, filed Jan. 30, 2012, Ser. No. 61/698,410, filed Sep. 7, 2012, and Ser. No. 61/737,729, filed Dec. 14, 2012.

BACKGROUND OF THE INVENTION

This invention relates generally to systems for facilitating and encouraging online purchases by providing a personal URL to direct a user to a personalized ecommerce webpage.

Transaction cards, stored value cards, or gift cards, as they are commonly called based upon their intended use, have become popular gifts. Gift cards typically comprise a stored value card whereby a certain cash equivalent value is encoded upon a magnetic strip applied to the surface of the card. This stored value may be determined by the vendor prior to packaging and display for sale or may be selected at the point of sale by the purchaser and loaded by the cashier using a magnetic card reader/writer. As an alternative to a magnetic strip, a transaction card may use a bar code to link the card to an account by which the associated value is stored in a computer database. Gift cards are typically provided with a generic and impersonal design, typically identifying the associated merchant for which the card may be used to purchase merchandise, and therefore are not personalized in view of the intended recipient. Gift card holders may be used to augment the gift of a transaction card by providing a surface for displaying decorations, images, or messages.

Gift cards are often presented for sale on display racks in stores, each card or packet of cards being hung upon a display stand peg. It is also known to provide a selection of gift cards for purchase online through a commercial website. Such websites may allow an online purchaser to select among gift cards offered by a plurality of vendors, make selections as to monetary value, and direct transmittal of the selected gift card or cards to the address of an intended recipient.

A uniform resource locator (URL) may be created to reflect the identity of a specific party identified with a specific website or webpage. This personal uniform resource locator (PURL) will typically take the following form: http://<party name or other selected personal identifier>.<domain name (typically the name or identifier of the owner of the domain)>.<com, net, biz, org or other top level domain>. A PURL may be used as a means for providing a customized or personalized web address without creating a separate domain.

BRIEF DESCRIPTION OF THE INVENTION

The purpose of this invention is to provide an enhanced online gifting experience that includes a webpage personalized for a gift recipient. A system according to the present invention includes an online interface for a purchaser to enter information identifying a gift recipient, as well as text, sound, images or video relevant to the gift recipient and/or to an event. The system may use portions of this information, or other information provided by a user, to create a personalized webpage identified and located via a personal uniform resource locator (PURL). The personalized webpage is a dynamic webpage that is addressed by the PURL which is created using information provided to the system, typically by an occasion organizer. A gift recipient's name can be utilized by the system when generating (naming) the PURL or the PURL can be custom named by the user. A unique identifier may be included in the PURL to avoid users creating duplicate PURLs.

The personalized webpage provides a means for a purchaser (i.e. organizer or host) to organize a gifting experience pertaining to an occasion or event, and includes options to allow a gift recipient and invited third parties (participants or guests) to add information and make selections on the webpage.

An embodiment of a computer-implemented personalized webpage gifting system may include a purchase interface for receiving data comprising an occasion selection, recipient identifying information, recipient preferences, organizer identifying information, a personalized webpage design selection, a gift card selection, gift card selection criteria, event details, a gift card holder selection, a video selection, payment information, and shipping information. Upon entering typically at least occasion selection, recipient identifying information, organizer identifying information, webpage design selection, and event details, the system creates a purchaser-initiated personalized uniform resource locator addressing a personalized webpage (also generated by the system) for celebrating a recipient occasion and facilitating gifting to the recipient by the purchaser and other participants.

In an embodiment of the system, a user initiating a celebration (also referred to as a purchaser, organizer or host) accesses a system purchase interface of a system user interface of a system website or other gifting platform. The organizer may begin organizing the celebration by selecting an occasion or event they wish to celebrate, typically on behalf of a gift recipient (recipient), for example a birthday, wedding or anniversary, or a seasonal celebration such as Christmas, Hanukah, or Valentine's Day. The organizer enters information identifying themselves, such as name and e-mail address, and also enters similar information identifying the recipient. The organizer selects and specifies the gender of the recipient and also enters the recipient's age. Additional information about the recipient, particularly information pertaining to interests and preferences, such as where the recipient likes to shop and where the recipient likes to eat, may also be provided or selected. Such information may be selected from menus or lists of predetermined third party providers or vendors (associated with gift cards or other gifting means) that may be provided by the system. The organizer may also select a gift card from a list of predetermined merchants or vendors, as well as a corresponding dollar amount to associate with the card, as the organizer's own gift to the recipient. The system provides the organizer with information regarding whether or not any of the available gift card vendors are offering specials or discounts to the gift card recipient with the purchase of the gift card.

The organizer selects whether to close out the celebration or keep it open for other participants to add to the amount or select additional gift cards and amounts. (Note that the term "participant" may include the organizer.) The organizer selects how the gift card will be delivered, either physically or electronically/digitally, e.g. by email. Notification of the gift card may be via social media or networks such as Facebook®, Twitter®, Pinterest®, Instagram®, YouTube®, Google+, or by SMS/Text Message or email. Physical gift cards are typically delivered to the recipient by mail or mail service. Electronic or digital gift cards may be delivered electronically via non-public (private) means such as email or text message or attachments thereto. The system provides the organizer with an option for the personalized webpage to include special offers or coupons from gift card brands, retailers, or manufactures for the gift recipient (PURL recipient) to view and consider. The option will typically be presented as an opt-in box that the organizer may select in order for the gift recipient to see the special offers or coupons made available from manufacturers or retailers at the time of the gift reveal (when the PURL and personalized webpage are presented to the recipient).

The system interface also provides the organizer with a selection of gift card holder personalization options. The options may vary depending on the gift card delivery method, either physical or digital. Personalization options for physical gift cards include selecting among holders that may bear customized images and text, holders that may include stored audio data for playback by audio circuits held within the holder, and holders that include stored video data for playback by video circuits held within the holder and various combinations thereof. Personalization options for digital gift cards include recording a video or audio message to announce the arrival of the gift card, customizing a celebration video that utilizes the recipient's name, photo and other identifying elements, or selecting an animation video that reveals the gift card to the recipient. If digital delivery of an electronic or digital gift card is selected, there are additional customization options available such as audio or video messages that allow the sender to announce the delivery or arrival of the digital gift card as well as animation videos that do the same.

During the process of organizing the gifting experience, the system creates a personalized webpage for the recipient including a PURL typically generated using information specific to the recipient, such as the recipient's name or a portion thereof. The PURL is then used by the system, the organizer or other participants to identify and link to the recipient's personalized webpage created according to the system. Initially, the personalized webpage typically includes a message to participants identifying the recipient and the occasion to be celebrated. Options are provided to participants such as adding dollar amounts to a gift card, selecting a new gift card and amount, adding messages or comments, viewing messages or comments, adding images or videos, viewing images or videos uploaded by participants or generated by the system, or adding other content to be used by the system. Typically, the personalized webpage will include indicia or instructions such as a countdown to the cut-off date, or occasion date, to prompt participants to take action. Such instructions may also be transmitted upon initiation by the organizer or at selected intervals to participants to remind participants to take action.

The organizer may select among various prerecorded video templates stored on a system server to customize a celebration video for extending the gifting experience for the recipient. The celebration video will be presented to the recipient as on or in association with the recipient personalized webpage. Images provided by the organizer or other participants, such as a photo of the recipient (and possibly the organizer), as well as information provided as text, is placed by video generation software associated with the system into predetermined fields within the video template thereby creating a customized video for the recipient. The celebration video is presented on a personalized webpage, or system interface thereof, and links to the personalized webpage may be provided to the recipient, the organizer, and other participants by the system via email or text messages or by postings on social media sites.

In the case of an open celebration, the organizer will typically specify a cut-off date by which any contributions by other participants must be made. Typically, the cut-off date is specified as just prior to the date of the occasion being celebrated. Upon closure of an open celebration, the system will typically display a webpage thanking participants for their participation in the celebration, indicating amounts and types of gifts prepared for the recipient, and displaying content provided by participants and the organizer. A link may also be transmitted via electronic means, such as email or text message, to participants and/or posted on social media sites. The system also creates and displays the finalized recipient personalized webpage including a greeting to the recipient and information such as indications of gifts provided, relevant dates (such as dates by which gifts will arrive in the mail or be transmitted to the recipient), links to the teaser video or other content, and links to content or information provided on social media sites.

The system also provides an option to select creation of an online photo album or scrapbook. The event organizer or others participating in the celebration (collectively referred to as participants) may create an online photo album consisting of any images provided by the participants, including photographs of the gift recipient. The pages of the photo album can be selected from a library of predesigned photo album page templates including predesigned photo layouts and page designs. The photo album functionality typically may be accessed by all participants to view and to upload images. Images may be uploaded from a participant's computer or mobile device (e.g. cell phone, smart phone, pad or tablet) or may be selected from a social media site such as Facebook®, Twitter®, Pinterest®, Instagram®, YouTube®, Google+.

The photo album is typically viewable by all participants throughout the event creation process and to the gift recipient as part of the recipient's personalized webpage. The photo album displays the provided or selected photographs or other images and allows a participant who uploads an image to include a brief description, or caption, with the image. Participants may also provide and associate comments with each image in the photo album. The various photos that are added may be sized, moved or repositioned on a photo album page by the participant who is adding the photos and customizing the album page. Photos may also be added, deleted, sized, moved or repositioned by the recipient.

A physical, printed photo album containing the image content (or a selected portion thereof) of the online photo album may be ordered for an additional cost. Printed photo albums are typically made available for ordering once the personalized webpage has been created and provided for access to the gift recipient. The gift recipient or a participant (ordering party) may select from a number of photo album covers and templates to be used with a printed album and may place an order by which the selected images will be printed, compiled and bound into a physical album mailed to the ordering party. In certain embodiments of the system, only the gift recipient may select printed photo album criteria such as images, covers and templates. In such case, participants in the event typically may also order and purchase the album designed by the gift recipient. In other embodiments of the system, any participant may make such selections to create a printed photo album personalized for that participant.

In addition to gift cards, or other gifts generated by the system through input from the organizer and participants, special offers may be provided and presented through the system from third parties such as vendors. Vendors may, for example, offer coupons, discounts or other special incentives for using gift cards by a certain date or for particular types of purchases or for purchases from particular manufacturers.

The system may also provide a selection of thank you cards, typically electronic or e-cards, amongst which the recipient may choose for transmission to one or more participants or groups of participants. Additionally, the system may provide means for the recipient to select among and/or customize a video message to participants. E-cards, video messages or links thereto may all be posted by or through the system to social media sites. The system may also provide means for the recipient to send a physical thank you card that is personalized with photos, sound, text or video and sent to a selected participant, several selected participants, or to all participants.

All Functionality described in the invention can either be provided via standalone ecommerce site or individual components/modules can be embedded in third party retailer sites via industry standard APIs provided by the system provider.

An embodiment of a method of providing a personalized webpage for online gifting may comprise certain of the steps of providing a system interface for receiving an occasion selection and recipient information, generating a personal uniform resource locator based upon a portion of said recipient information, generating a personalized webpage addressed by said personal uniform resource locator, providing a system interface for receiving a first set of identifying information, a gift card selection, a gift card dollar amount selection and a gift card delivery method selection, a second set of identifying information, a closed celebration selection or an open celebration selection, a gift card holder selection, one or more gift card holder personalization option selections, and other personalized content, and providing means for notification of the personalized webpage. The recipient information may include gender, age, location and preferences. The gift card holder may be selected from the group consisting of holders personalized with text, holders personalized with images, holders personalized with audio, and holders personalized with video. The personalized content may be selected from the group consisting of text, image file, audio file, and video file. The means for notification may be selected from the group consisting of text message, email message, electronic message, and social media network.

Other advantages of the invention will become apparent from the following description, wherein is set forth by way of example an embodiment of the present invention.

BRIEF DESCRIPTION OF THE DRAWINGS

FIG. 1a is a chart illustrating steps in an embodiment of a method according to the present invention.

FIG. 1c is a chart illustrating steps that may be taken in an embodiment of a method according to the present invention.

FIG. 1d is a chart illustrating steps that may be taken by a recipient taken in an embodiment of a method according to the present invention.

FIG. 2 is a chart illustrating exemplary occasion selections.

FIG. 3 is a chart illustrating exemplary gift recipient identifying information, interests and preferences.

FIG. 4 is a chart illustrating exemplary organizer identifying information.

FIG. 5 is a chart illustrating exemplary design selections.

FIG. 6 is a chart illustrating exemplary gift card selection criteria.

FIG. 7 is a chart illustrating exemplary occasion detail criteria.

FIG. 8 is a chart illustrating exemplary gift card holder selection types.

FIG. 9 is a chart illustrating exemplary celebration video selection criteria.

FIG. 18 illustrates an example of an occasion selection page of a purchase interface including occasion selection graphic elements.

FIG. 20 illustrates an example of a detail entry page of a purchase interface.

FIG. 21 illustrates an example of a first gift selection and customization page of a purchase interface.

FIG. 22 illustrates an example of a second gift selection and customization page of a purchase interface.

FIG. 27 illustrates an example of a second personalized webpage including celebration video and gift access elements.

FIG. 35 illustrates an example of a personalized webpage including elements for building a list of invitees.

FIG. 36 illustrates an example of a personalized webpage including elements for activating a scrapbook and selecting notifications.

DETAILED DESCRIPTION

Figure 1B:
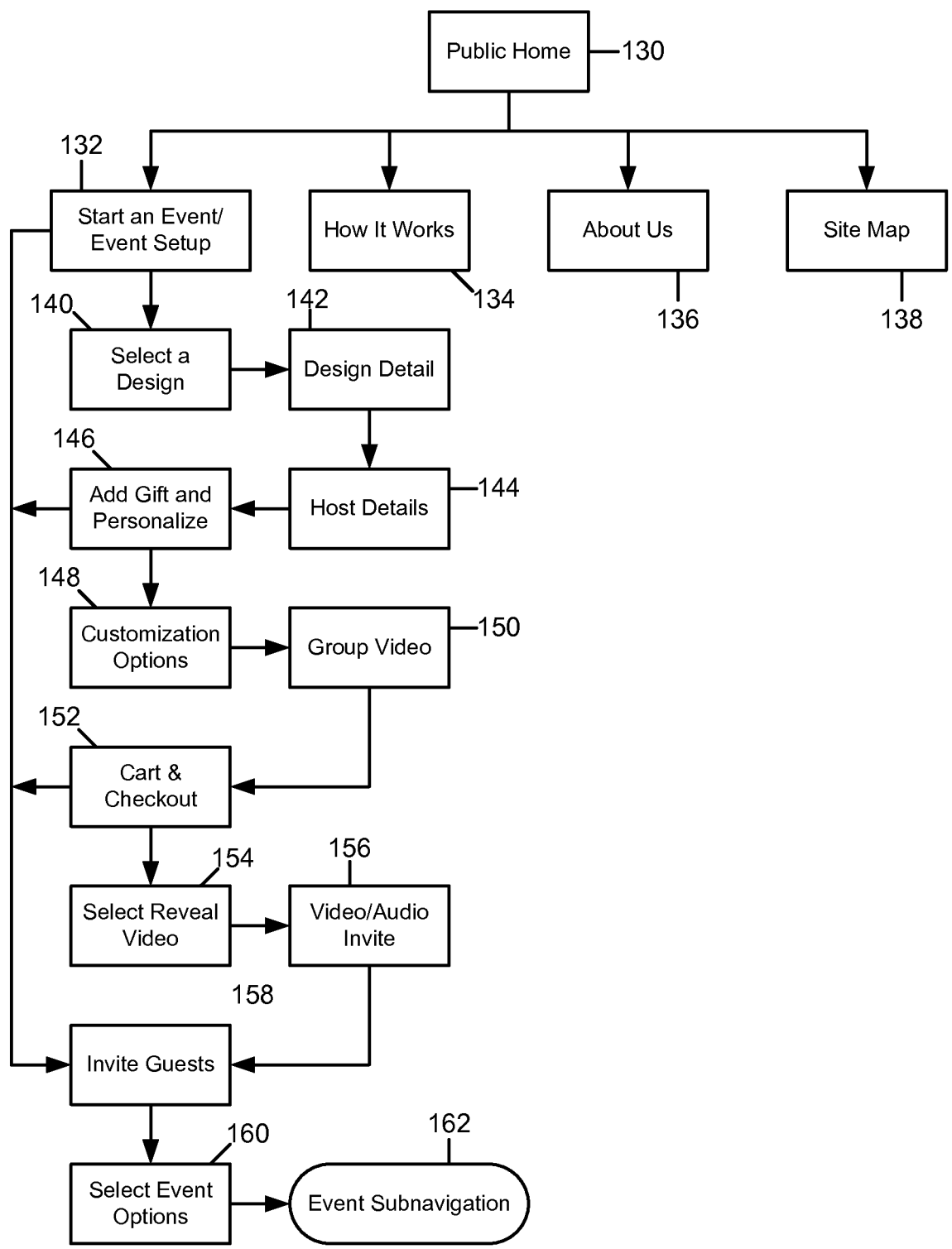
FIG. 1b is a chart illustrating steps that may be taken by an organizer in an embodiment of a method according to the present invention.
Figure 13:
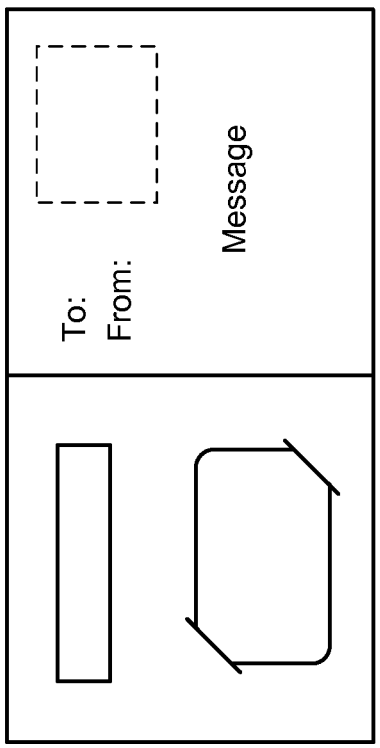
FIG. 13 is a plan view of an open, customized or occasion-specific gift card holder.
Figure 14:
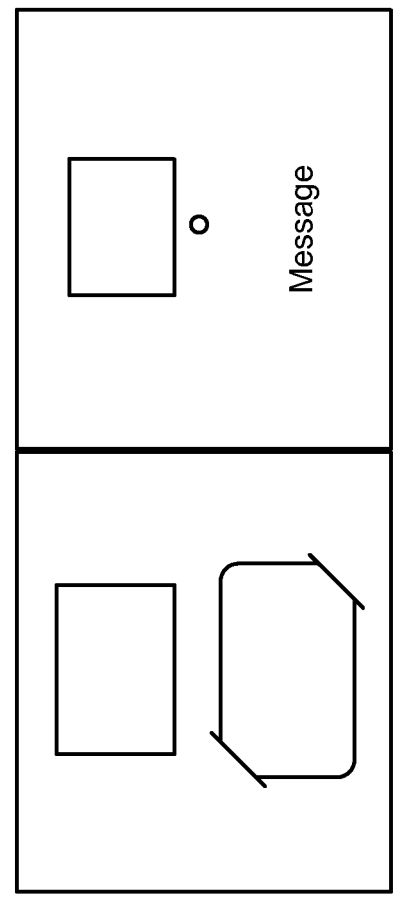
FIG. 14 is a plan view of an open, video gift card holder.
Figure 10:
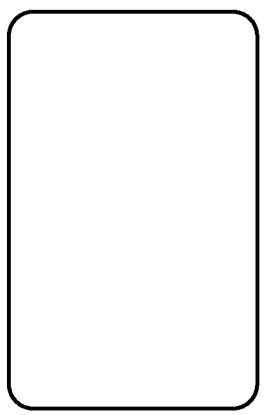
FIG. 10 is a front plan view of a gift card.
Figure 11:
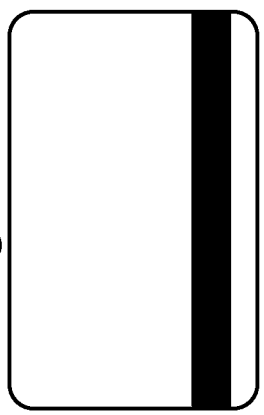
FIG. 11 is a rear plan view of a gift card with a magnetic strip.
Figure 12:
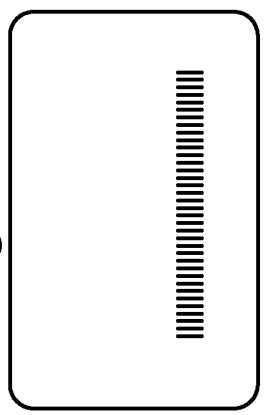
FIG. 12 is a rear plan view of a gift card with a barcode.
Figure 15:
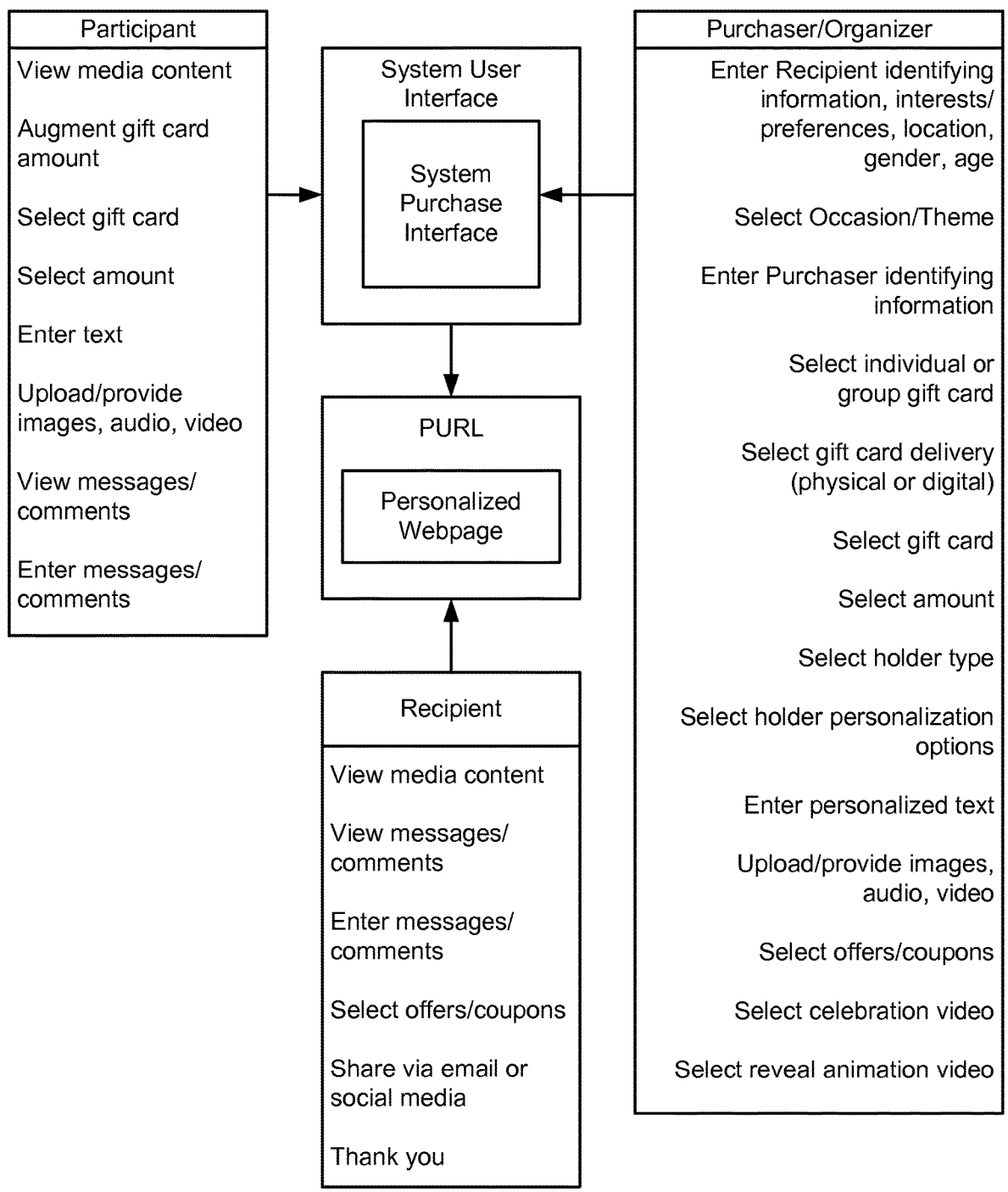
FIG. 15 is a diagram showing elements of a system as described herein.
Figure 16:
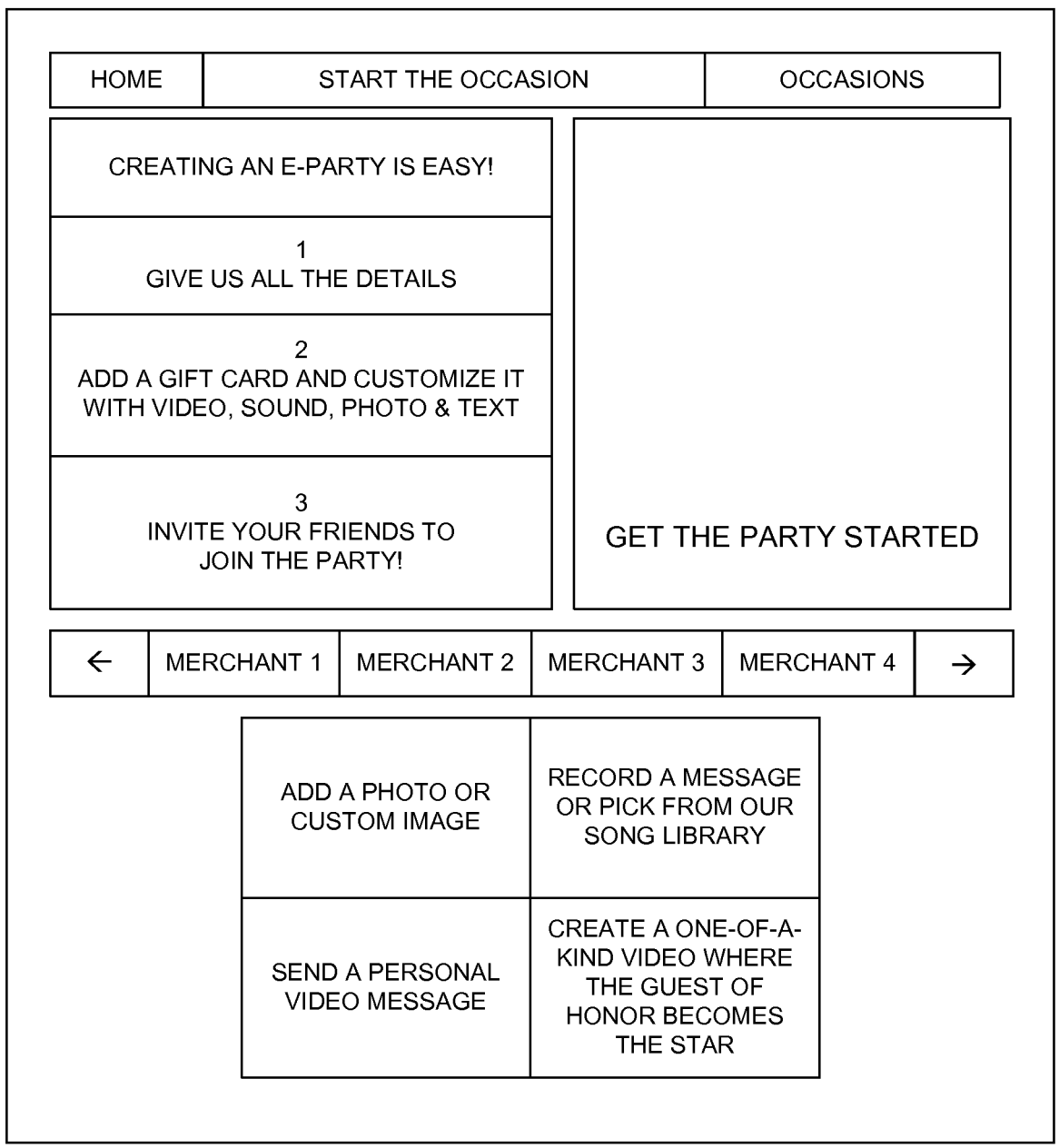
FIG. 16 illustrates an example of a home page of a purchase interface.
Figure 17:
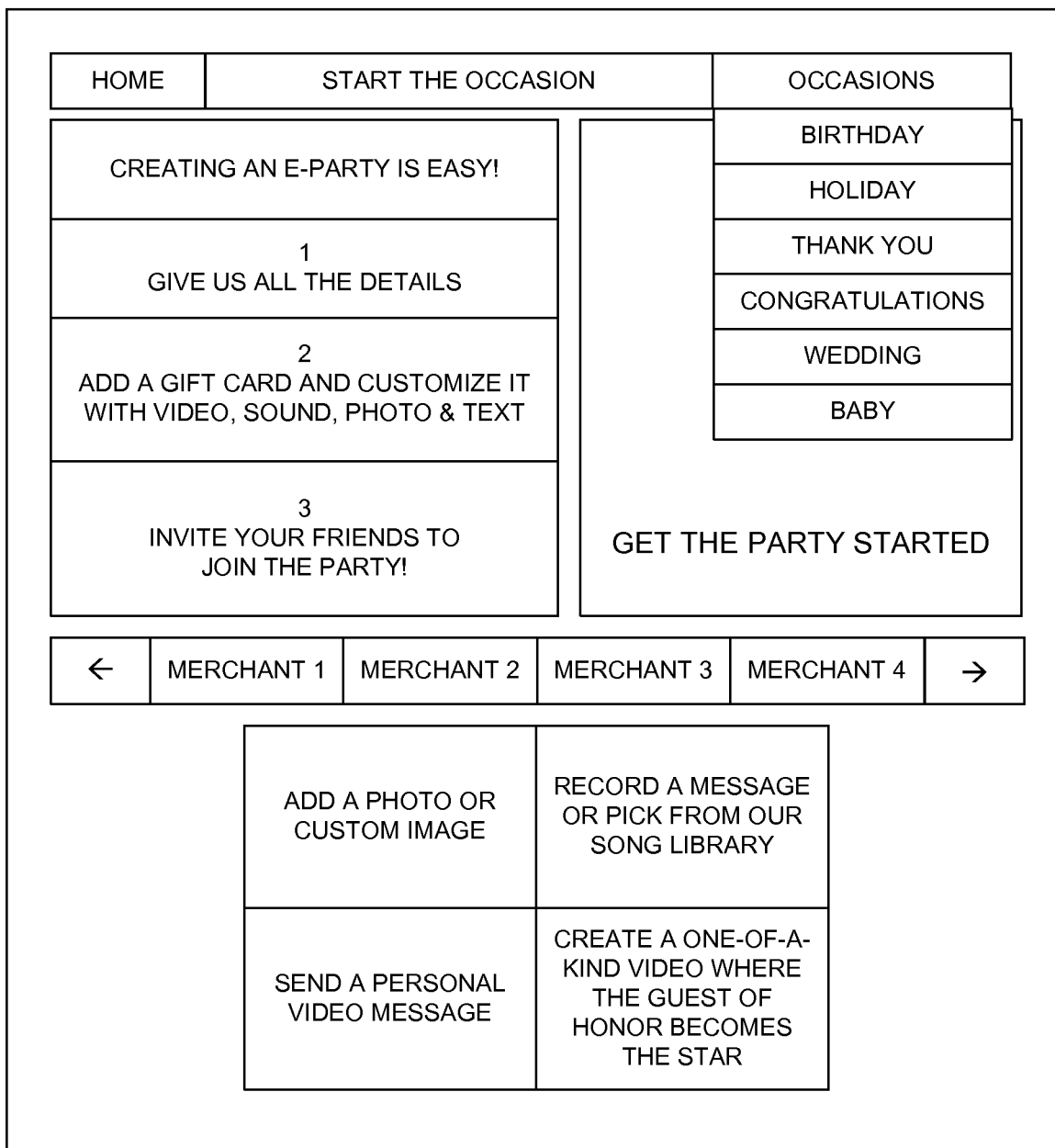
FIG. 17 illustrates an example of an alternative home page of a purchase interface having an occasion selection drop down menu.
Figure 19:
FIG. 19 illustrates an example of an occasion selection page of a purchase interface including birthday design selection graphic elements.
Figure 23:
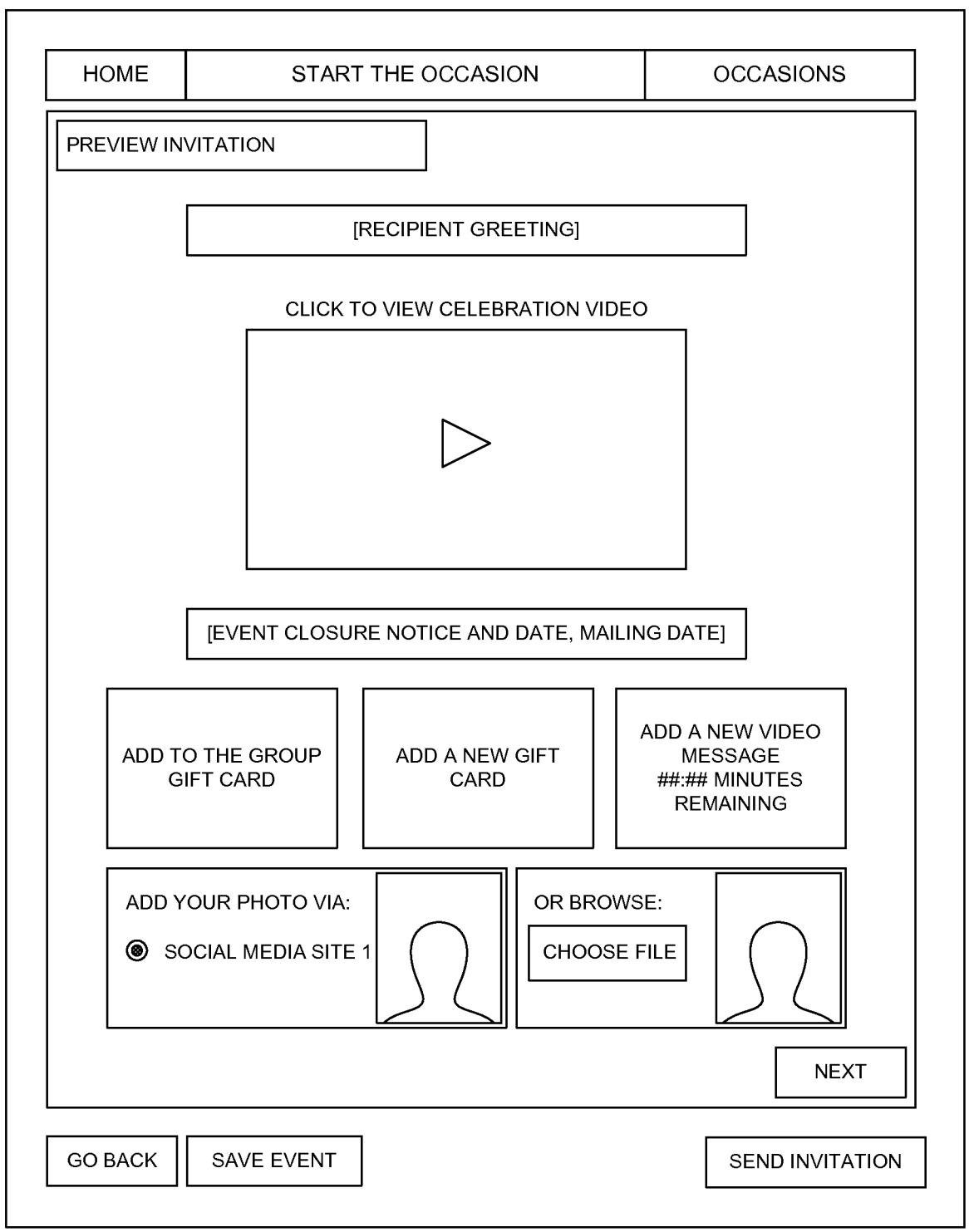
FIG. 23 illustrates an example of an invitation preview page of a purchase interface.
Figure 24:
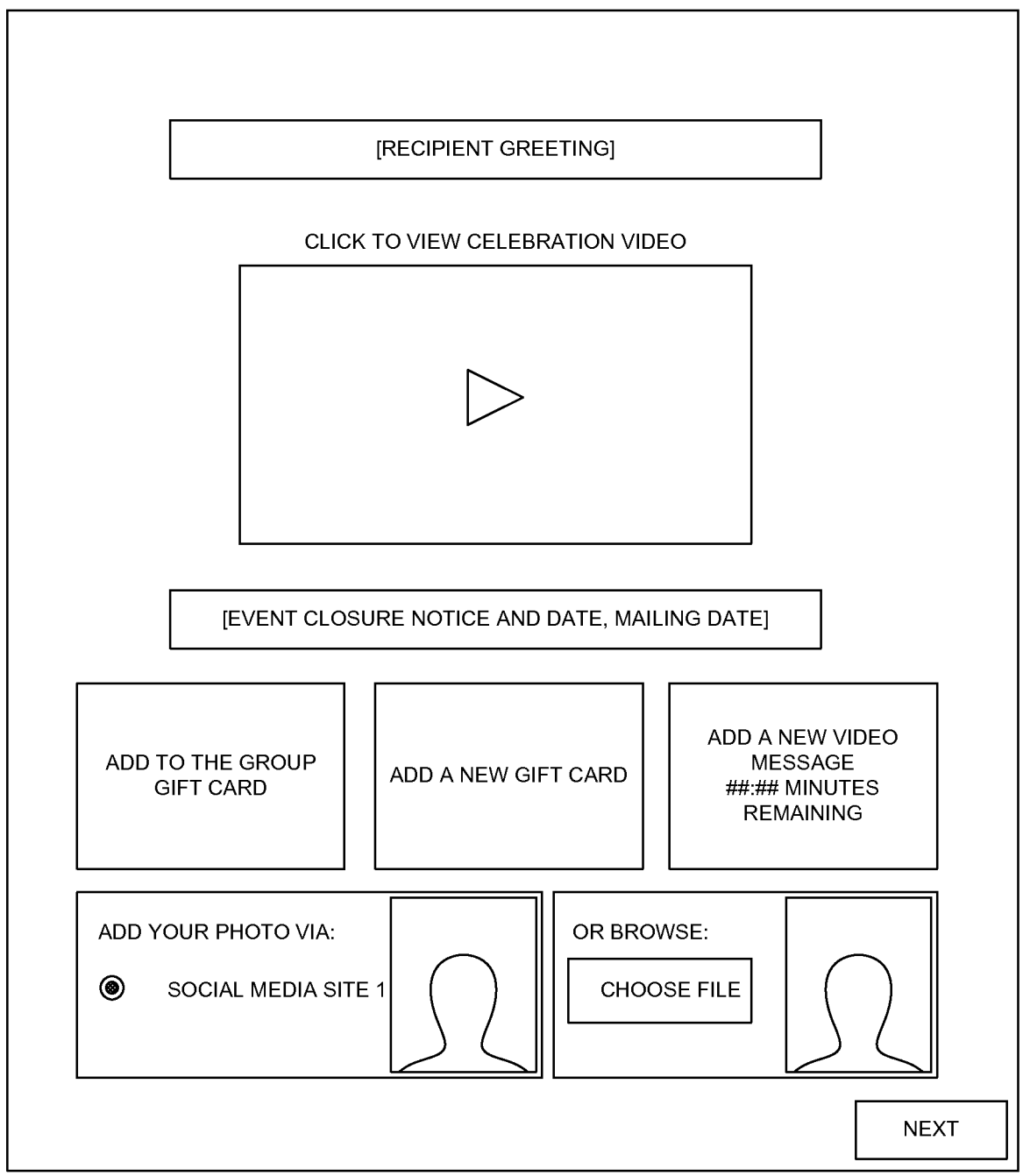
FIG. 24 illustrates an example of an invitation page.
Figure 25:
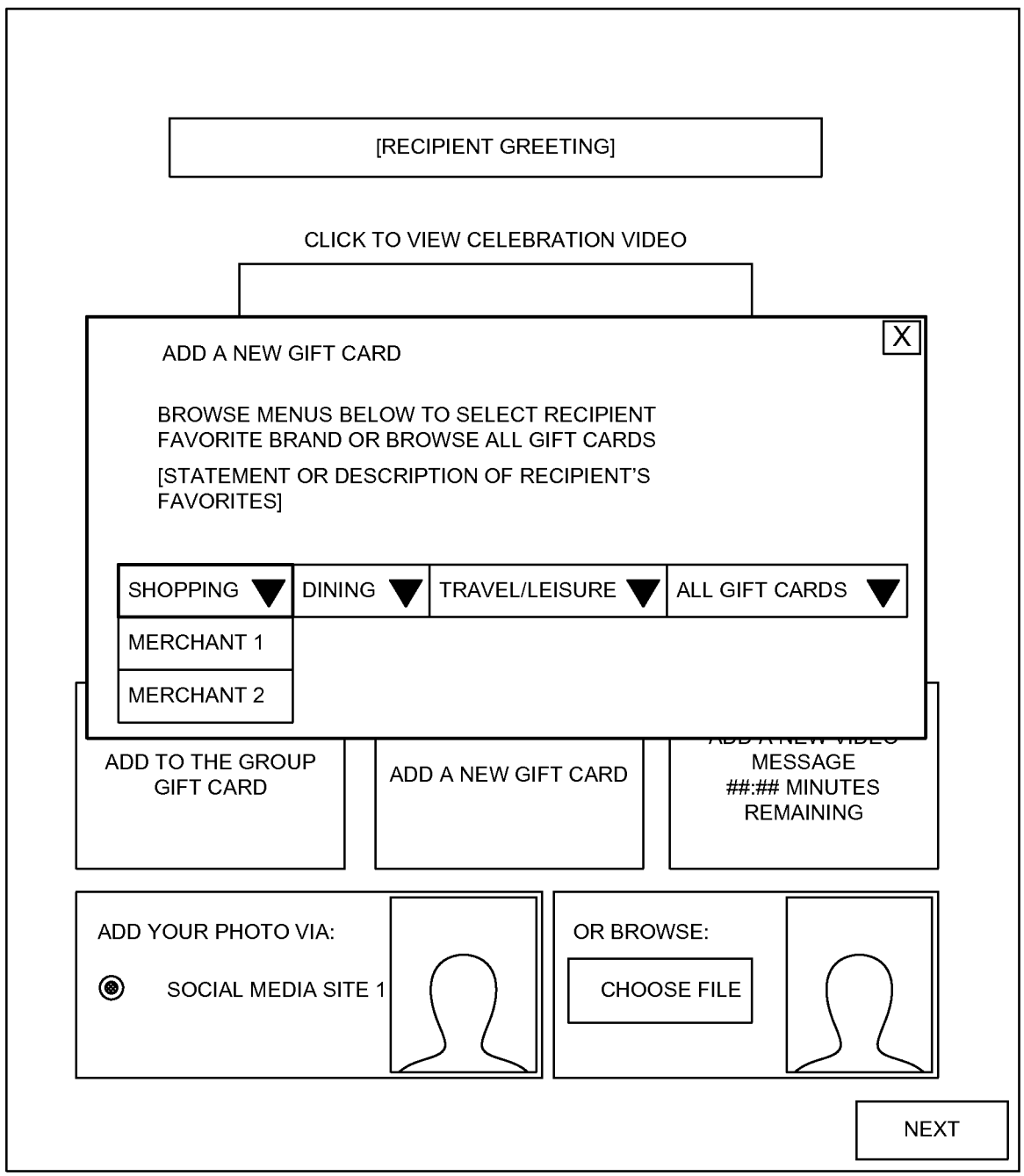
FIG. 25 illustrates an example of an invitation page including participant gift card selection elements and menus.
Figure 26:
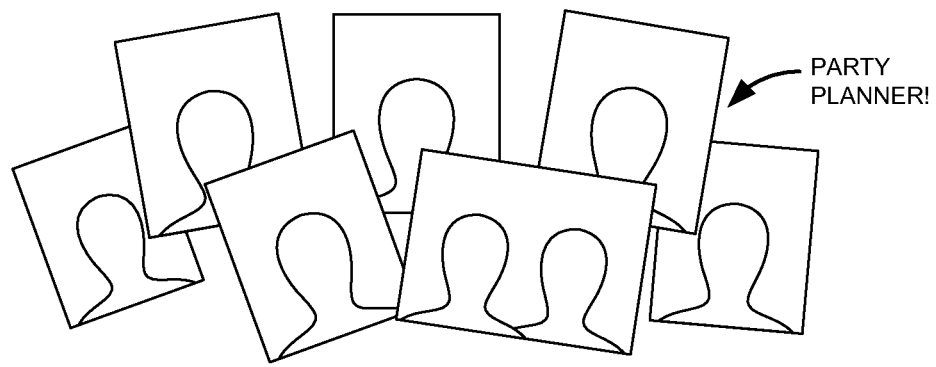
FIG. 26 illustrates an example of a first personalized webpage.
Figure 28:
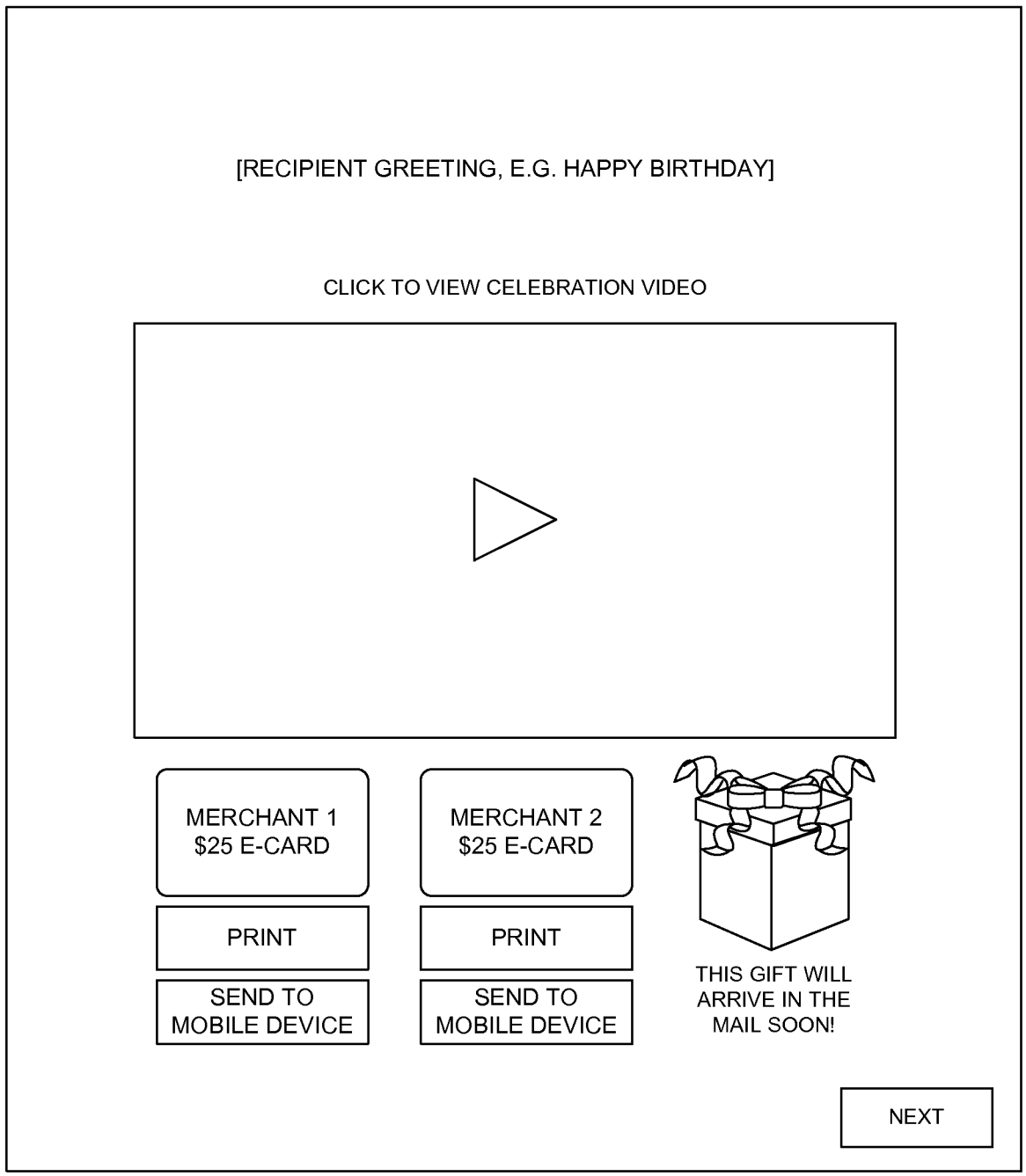
FIG. 28 illustrates an example of a second personalized webpage including activated first and second gift access elements.
Figure 29:
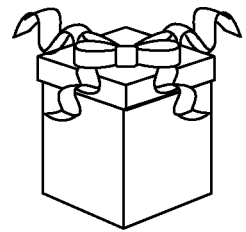
FIG. 29 illustrates an example of a third personalized webpage including merchant offer access elements.
Figure 30:
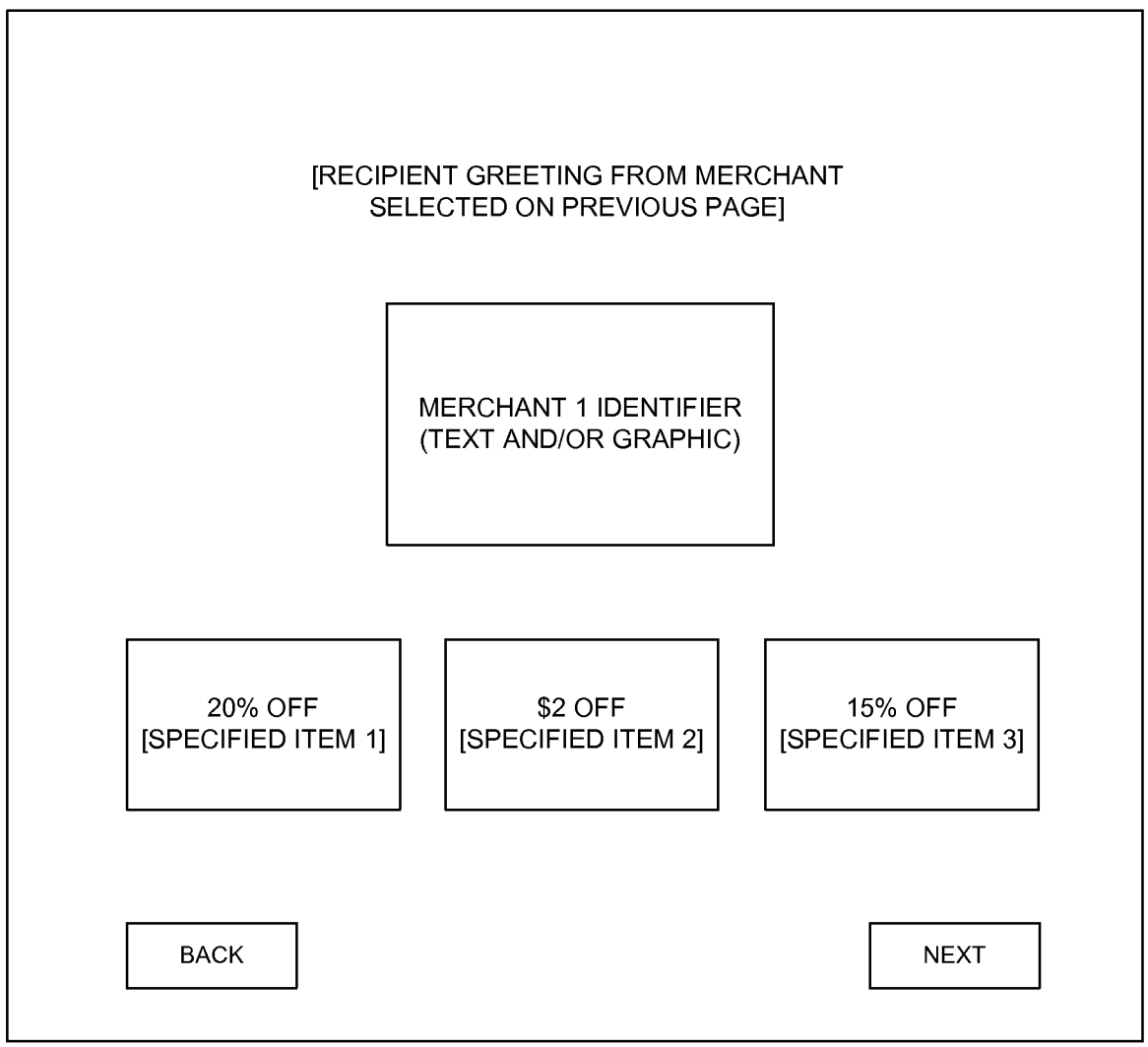
FIG. 30 illustrates an example of a fourth personalized webpage including merchant offers.
Figure 31:
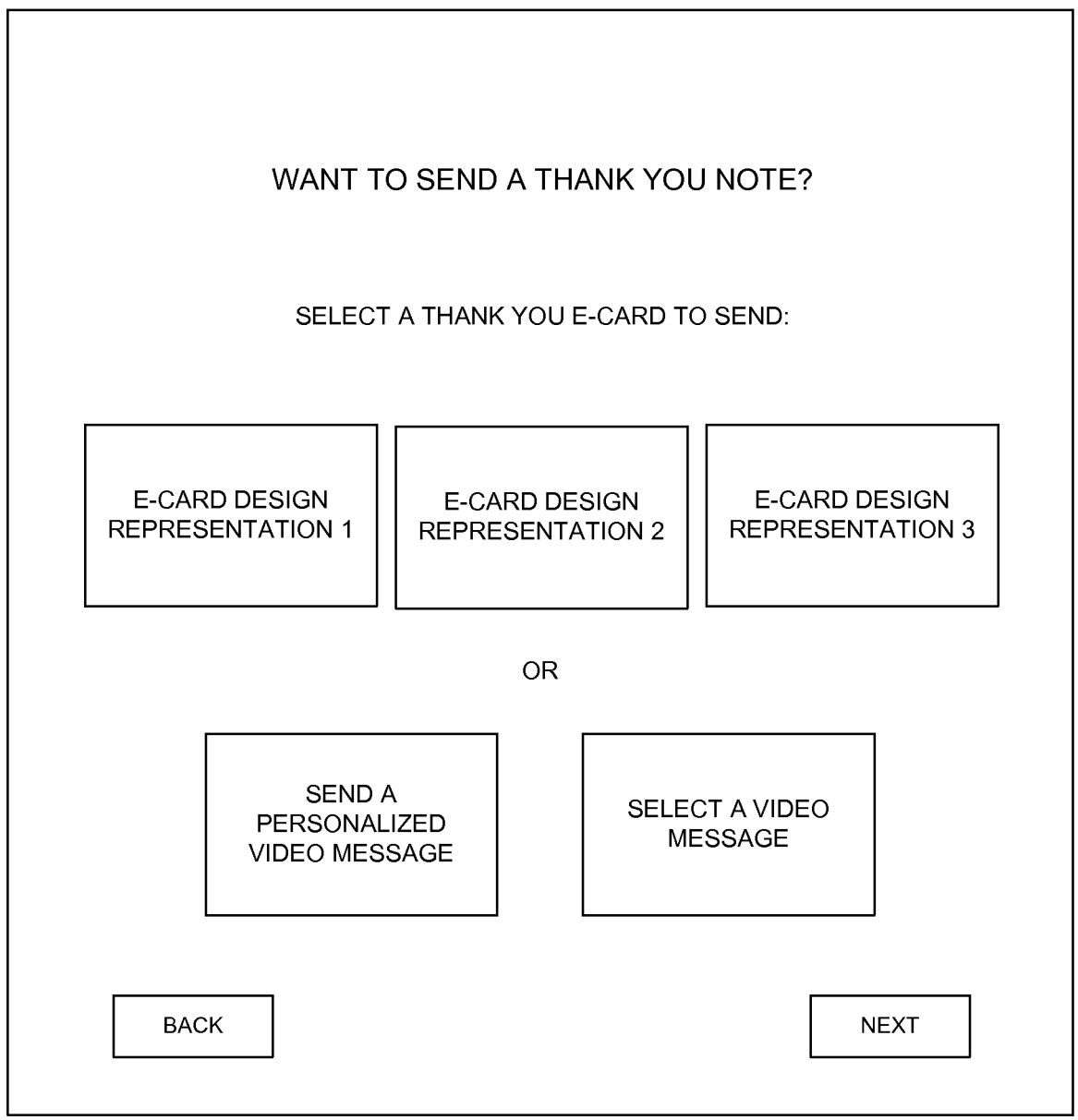
FIG. 31 illustrates an example of a fifth personalized webpage including thank you card and video message selection elements.
Figure 32:
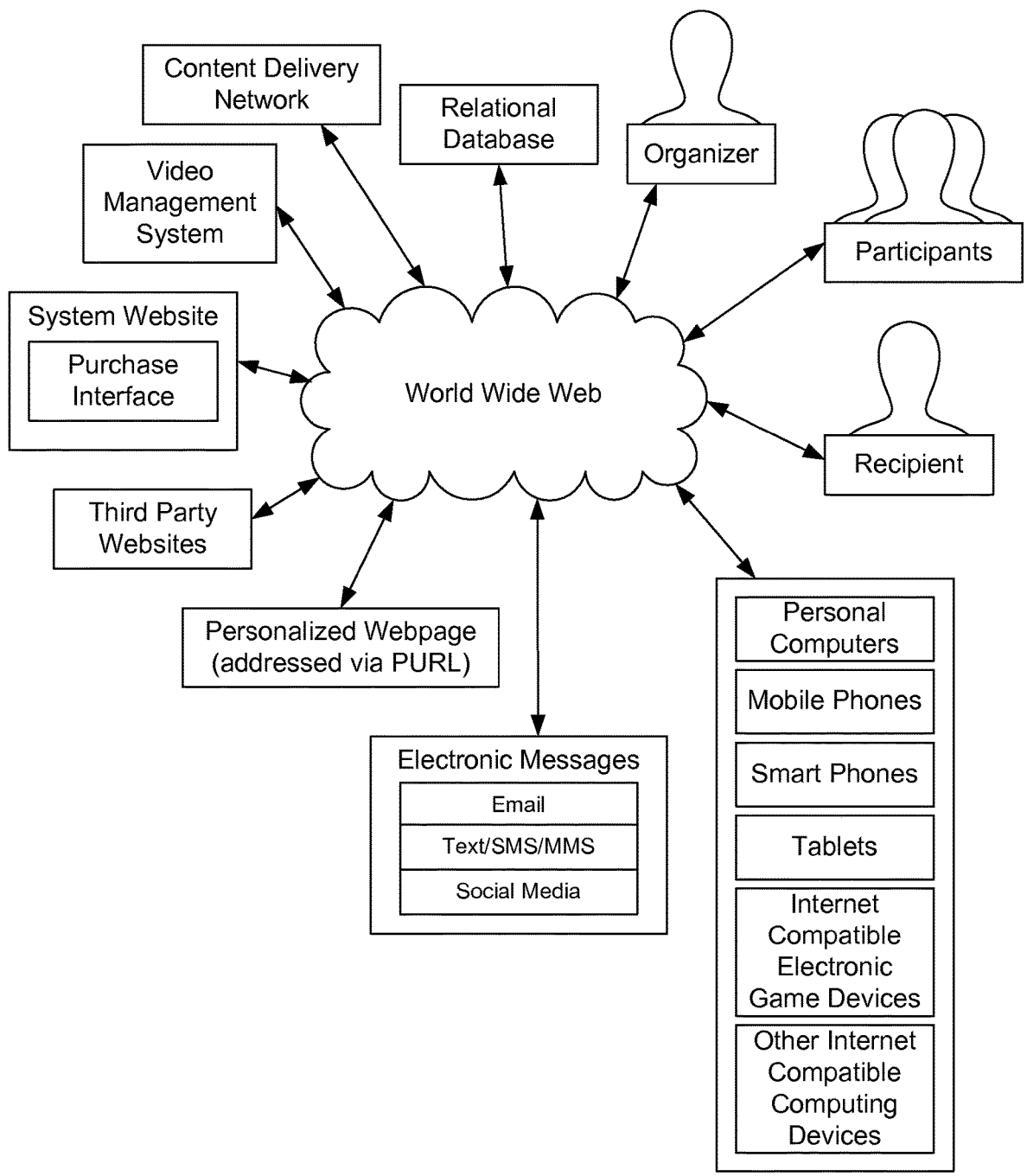
FIG. 32 is a diagram showing interconnectivity of elements of an embodiment of a system according to the invention.
Figure 33:
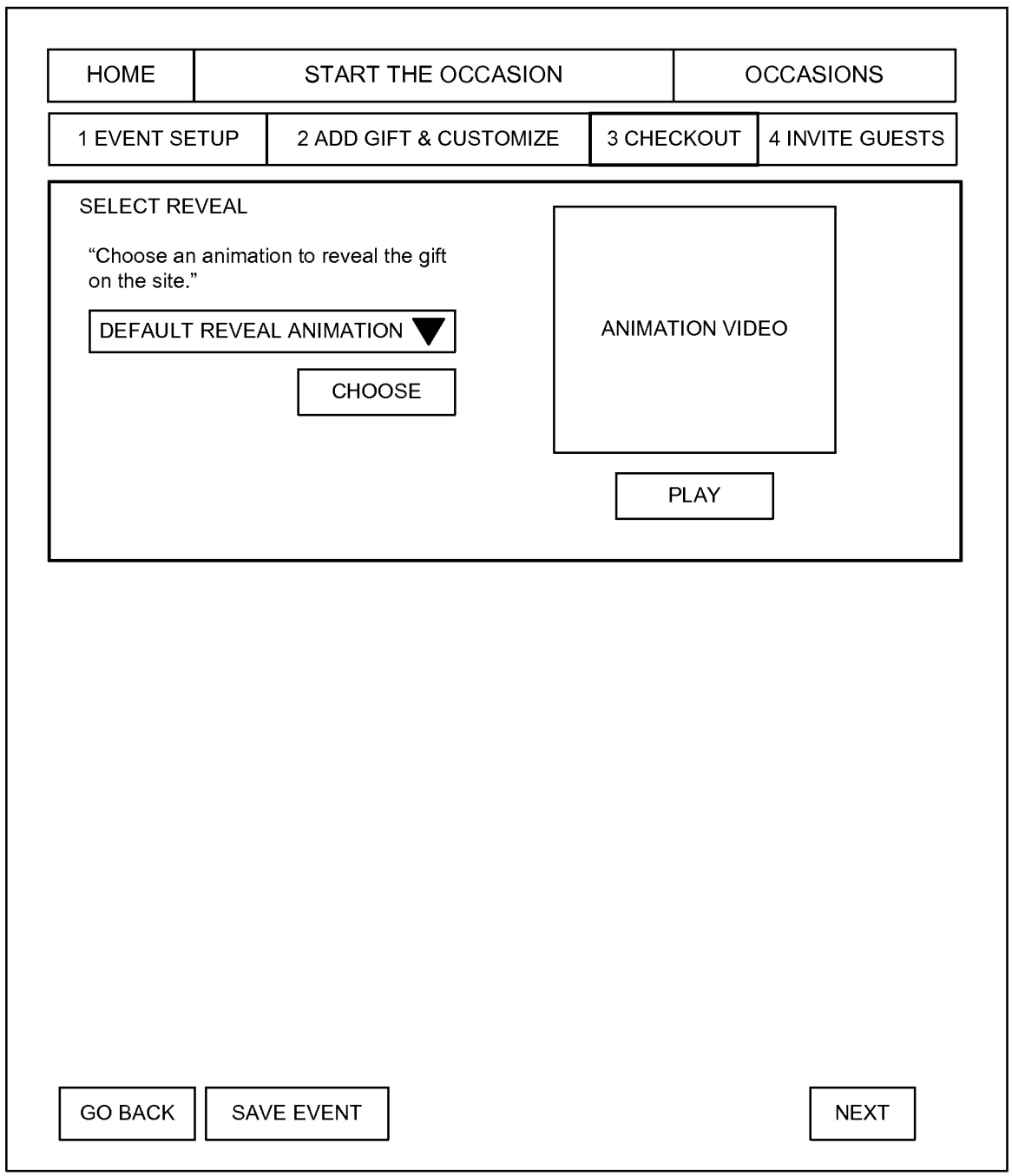
FIG. 33 illustrates an example of a personalized webpage including elements for selecting an animated reveal video.
Figure 34:
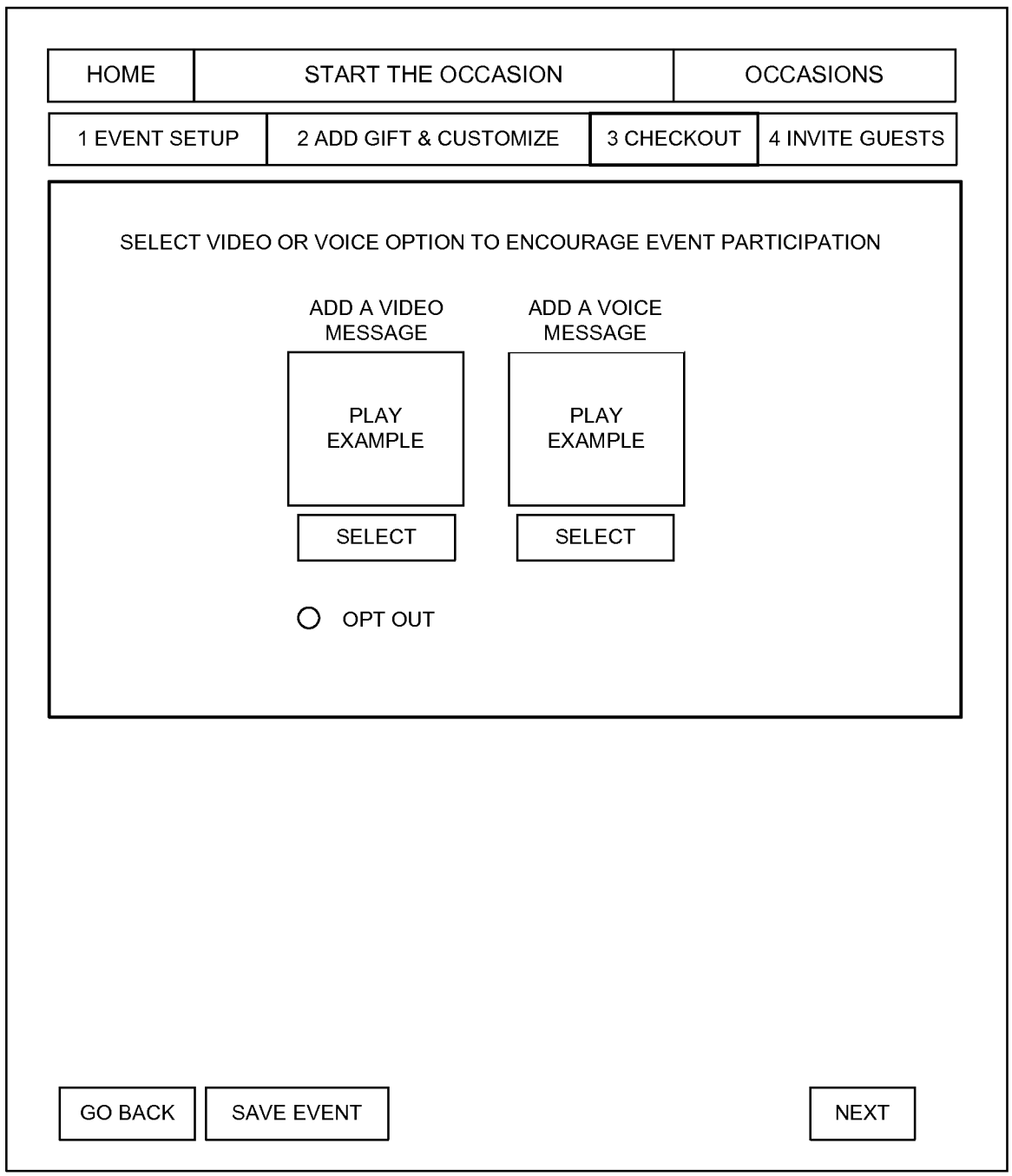
FIG. 34 illustrates an example of a personalized webpage including elements for selecting video or voice messages.
Figure 37:
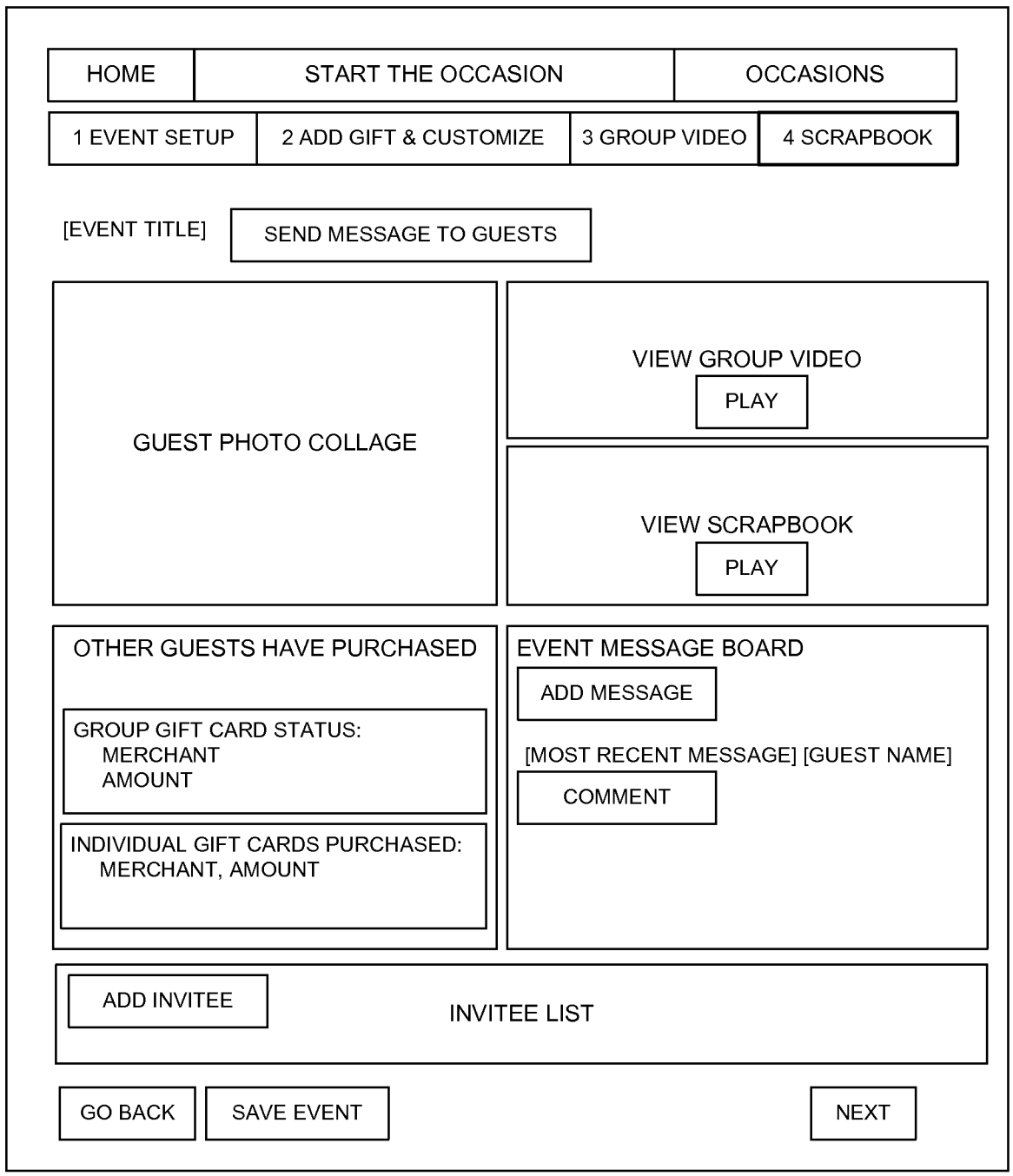
FIG. 37 illustrates an example of a personalized webpage landing page including elements typically available to an organizer.
Figure 38:
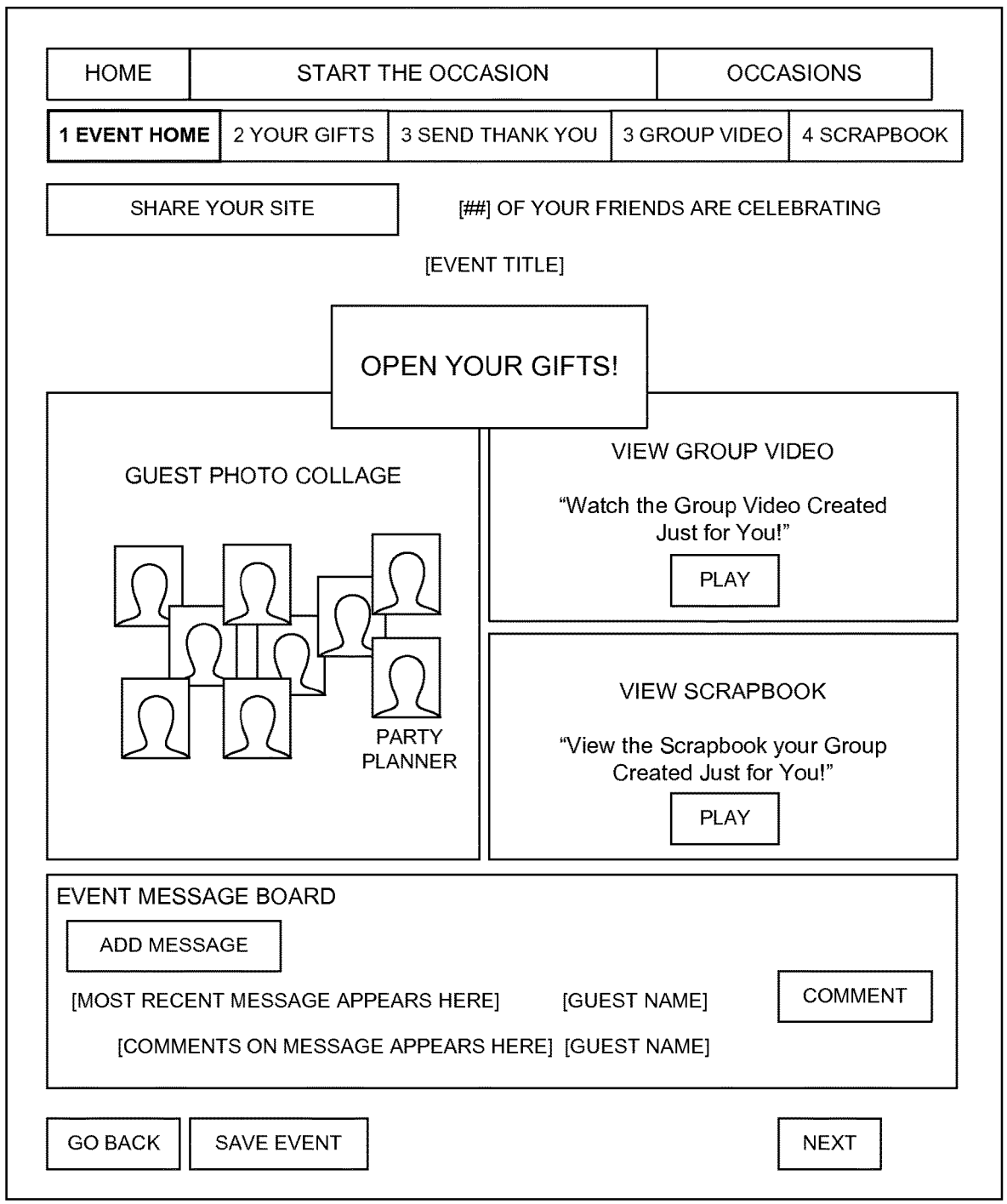
FIG. 38 illustrates an example of a personalized webpage including elements shown and available to a recipient.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A system according to the present invention includes a purchase interface of a system website for receiving initial purchase and personalization information from a purchaser. The purchase interface is typically a webpage created using HTML (e.g. HTML5), XML, XHTML, PHP (PHP: Hypertext Preprocessor), Javascript®, Java® and/or equivalent programming languages or scripts as generally known in the field of art. A user (i.e. purchaser or organizer) may arrive at the purchase interface via a link (e.g. html link) provided on a third party website, such as a third party website offering gift cards or other goods or services, or the user may arrive at the purchase interface by directly accessing a system website. Certain embodiments or components of the purchase interface may be accessible via a browser, mobile Internet application, or other Internet-accessible software on a personal computer, smart phone, tablet device, electronic game device or other electronic device used for Internet access.

The purchase interface allows the purchaser to select among several themes or occasions such as birthday, anniversary, wedding, congratulations, thank you, back to school, new baby, bridal, graduation, house warming, and including seasonal themes or occasions such as Christmas, Hanukah, Valentine's Day, Easter, Mother's Day, Father's Day, Boss's or Administrative Assistant Day. Selection of a theme or occasion will influence or determine the options offered to the purchaser by the system during the transaction.

The purchaser is prompted to enter information identifying the purchaser and information identifying the recipient. Such information may include name, address, telephone number and email address. If the purchaser uses a device including GPS to access the system, such as mobile telephone, GPS data may be provided by the device to the system as a means of providing purchaser location. Further information entered for the gift recipient may include gender, age, interests, etc. Providing interests to the system may include the purchaser entering or selecting among vendors typically frequented or preferred by the gift recipient. The purchaser is then prompted to select one or more gift cards or other gifting means, select or enter monetary amounts, and provide personalization content, such as photographs or other images, sound or video files, or one or more messages to the recipient.

The purchaser may be presented with a choice to either create a closed celebration or gifting presentation, whereby all selections are determined during the purchase process, or to create an open gifting presentation, whereby the purchaser serves as a celebration organizer, and third parties, and in some embodiments the recipient, may provide subsequent additional content and selections.

The system may provide personalization choices to the purchaser such as whether to deliver a selected gift card or cards to the recipient via a gift card holder selected among pre-designed holders offered for selection, via a holder customized to include purchaser provided text, images, or sound, or via a video gift card holder customized by inclusion of a selected or purchaser-provided video. The video gift card holder can store multiple videos provided by system users which may then be played sequentially. The PURL system allows users to load multiple videos limited in total length only by the storage capacity of the video gift card holder. The system also allows each participant to view storage capacity (presented in video run time) remaining on the video gift card holder. The system will prevent video messages that go beyond that capacity from being uploaded. In certain embodiments of the system, the system assigns a set time limit per participant and will not accept video messages from a participant that exceed that time limit. The system will also allow participants to view video messages uploaded by all participants, typically as a draft compiled video that includes all uploaded content to that point.

An email notification message is generated by the system to the gift recipient and includes a link to a personalized webpage identified by a PURL. The personalized webpage and PURL are both created by the system in response to selections and information provided by the purchaser. Typically, the PURL will incorporate some portion of the recipient's name or other personal identifier. In certain instances the identifier may relate to the name of a company or organization. The personalized webpage may include information provided by the purchaser such as the recipient's name, images, messages to the recipient, and information regarding gifting. Means may be provided for the recipient to add information to the webpage such as a wish list or a message to third parties that view or interact with the webpage. Means may also be provided for third parties, such as friends, relatives, or coworkers to add information for presentation on the webpage or other use by the system, such as details of an event (e.g. birthday party), messages to the recipient, or photos or video clips of an event. Information generated by the system or provided by the system provider may also be presented on the webpage such as information identifying gifting opportunities for a party interacting with the webpage. Information provided by a gift card vendor, or affiliates of the system provider or gift card vendor, may also be provided. For example, offers and advertisements generated by or on behalf of the gift card vendor or affiliate may be displayed.

In order to invite third parties to contribute to the content of the personalized webpage and/or to make gift purchase selections, a link incorporating the PURL associated with the webpage may be sent to third parties via email, text message, social media or similar means. The third party invitation to participate may include graphics and text designed to encourage participation and build excitement. The invitation may be sent well in advance of an alert to the recipient, so that third parties may make contributions and selections to the webpage, as well as gift purchases, prior to presentation of the webpage to the recipient. Alternatively, the recipient may be alerted shortly after creation of the personalized webpage and PURL so that the recipient may also influence content and selections, such as by providing a wish list or other information useful for participants to make gift purchase decisions.

The names of parties who are invited by the organizer to participate in the group gifting occasion, event or celebration, i.e. to become participants, will be listed publically on the PURL page. Those who have contributed a gift will be noted visually to represent their participation. Information received about participant participation from the PURL invitation page will be stored in a relational database (e.g. Oracle, SQL Server, MySQL or other operable databases) and presented for viewing by all invitees. PHP or other operable means is used to collect data from the PURL invitation page and transfer data to the relational database for storage. Data indicating which invitees have participated or have not yet participated may be used to send reminders or notifications (such as reminders for the group gift cut-off date to those who have not yet responded). A participant may recommend another party by adding that party's name and/or email address to a system form for receipt by the system. The recommendation, including any information provided by the recommending participant, is provided by the system to the organizer so that the recommended party may be accepted or rejected by the organizer for acceptance as a participant. Such acceptance or rejection is indicated by the organizer to the system via user interface on a personalized webpage accessible to the organizer. The organizer may accept or reject a recommended party for participation by activating an element (e.g. check box, radio button or other known type of selection element) on the webpage. If a recommended party is accepted, a record corresponding to the party, such record typically including an email address, is added to the database record for participants. In certain embodiments, a notification may be provided by email or other means to the organizer when a participant recommends another party for participation.

In order to alert the recipient to the personalized webpage, and to provide a link incorporating the PURL associated with the webpage, the system may generate an email, text message, social media message or similar means of communication to the gift recipient. Alternatively, or in conjunction with the recipient alert message, a teaser video may be created using content provided and selected by the purchaser with a link to the teaser video provided in the message.

A celebration video is a video file which may be provided on the personalized (PURL-addressed) webpage to extend the celebration for the recipient by communicating a particular sentiment, occasion, or gift card brand experience to the recipient. The celebration video is typically personalized by uploading the recipient's photo to a system central server. Text content can be added to certain customizable text fields such as the recipient's name and the occasion or sentiment. Upon uploading personalized content, the video is then rendered or composited to include the personalized content. The recipient is able to share the celebration video via social media channels by sharing the unique video URL with their social networks (e.g. Facebook®, Twitter®, Pinterest, Instagram®, YouTube®, Google+).

To select and enable generation of a celebration video, the purchaser (typically the organizer) selects a celebration video type from among several prerecorded videos (video templates) that may be viewed on or from a system interface. The organizer uploads a photograph of the recipient (and if provided as an option, a photograph of the organizer as well), enters the recipient's name in a text box, selects an appropriate occasion or sentiment from among several provided by the system, and enters the recipient's email address. In some embodiments, additional text fields may be provided to receive additional user text and additional photo or other image uploads may be accepted. The photograph and text are rendered into the selected video based on pre-defined fields within the video thereby creating an augmented reality experience for the recipient. The user is provided with an option to preview the video and make changes to the user information. When the user is satisfied with the video it is saved to a central server, i.e. a system video server. Upon completing the transaction via a payment/checkout procedure, the customized video message is added to the PURL webpage (the personalized webpage) where it can be viewed by other participants and utilimately by the recipient when they receive the PURL webpage.

As a further alternative that may be used in conjunction with any of the above means of notification, a third party invitation to participate, and/or an alert to the recipient, may be conveyed via social media such as a post to one or more Facebook®, Twitter®, Pinterest®, YouTube®, Google+ or other comparable accounts. System communications with social media networks may be made via network APIs and JavaScript SDKs, for example, using the Facebook SDK to invoke various APIs. It should be appreciated that communications between the system and social media networks make occur by any operable means. In addition to a link to the PURL webpage, these posts may provide additional information related to the recipient and event and provide a means for coordinating activities related to the event.

As an alternative to email or text messages to convey links, QR codes may be provided on gift cards, gift card holders, inserts, backer panels, correspondence, or other physical items conveyed to the gift recipient. These QR codes may be used as an alternative machine-readable method to encode and convey links or other information relative to the system.

A method in accordance with the present invention includes the steps of the gifting system providing a home page explaining the celebration or event to a party who serves as an initial purchaser and, in certain embodiments, an event or celebration organizer. The system interface provides a menu or other selection means for the organizer to select among predetermined occasions. Depending on the occasion type selected, the system interface may provide means for selecting among predetermined themes or designs as well. The system interface comprises a computer program that runs on a computing device such as a personal computer (e.g. desktop, laptop, notebook), server, mobile devices such as a tablet, mobile phone, iPod®, iPad®, and similar devices capable of presenting a user interface and networking to other computing devices.

The system interface receives details from the organizer such as the host or organizer's name, telephone number and e-mail address, the guest or recipient's name and e-mail address, an event title, and event date, and a cut-off date for participation. The system interface provides one or more menus or other selection means by which the organizer may specify recipient preferences as to shopping, dining, travel, or other purchase categories. The organizer selects whether or not to add a gift card to the purchase and, if so, whether the gift card will be a group gift card (receiving monetary contributions from multiple participants) or an individual gift card (paid by one party, typically the organizer). The organizer selects a gift card vendor, provides an amount, provides a cutoff date for contributing amounts to the gift card by other participants, and selects whether the gift card is to be a physical gift card for delivery to the recipient via mail or delivery service or an electronic gift card (also referred to an e-gift card or digital gift card). An electronic gift card is typically embodied as an electronic message that includes a code to a stored value or other redeemable value. An electronic gift card may be send to a recipient by electronic message.

If the organizer selects a physical gift card, the system interface provides means for selecting and/or customizing a gift card holder. The purchaser may be presented with various design options for gift card holders which may be segregated among categories. If a user selects a category (e.g. color, design type, theme or occasion, pre-written message), then designs from that category will be presented for further selection. Typically, thumbnail images of designs are first presented for viewing on a system interface but may be selected by the purchaser to activate presentation of an enlarged view of the selected design.

Whether an electronic gift card or physical gift card is selected, the system provides an option for the selection and customization of a video. If a physical gift card (as opposed to a digital gift card) has been selected and will be delivered to a gift recipient, the video comprises a celebration video to be provided for viewing by the recipient to enhance the recipient's gifting experience and celebration. If a digital gift card is selected for delivery, a celebration video may be provided for viewing on the PURL webpage. The celebration video may be selected, or a custom video may be created by the organizer (or by the organizer and by the participants as a group video) on the system. If a group video is selected, the organizer would make that designation, optionally determine a length of a video message that each participant would be able to contribute, and each participating participant would have the ability to record a brief video message to be compiled with all other individual video messages and presented to the recipient on the PURL webpage as one sequential video. The celebration video functionality is provided and intended to make the gift recipient feel special upon viewing the gift or gifts at the personalized webpage and to serve as another way to extend the celebration of the special occasion.

The organizer provides an email address to be used by the system to send a link to the PURL which may be followed by the recipient to access the personalized webpage. The video, whether a teaser video or celebration video, will be viewable on the personalized webpage upon delivery of the PURL link to the recipient. The video is created from a video template selected by the organizer from among several video templates provided by the system. Content provided by the organizer, such as images and text, are inserted by the system into predetermined fields in the video template. The template and customized content is then rendered to produce the final video for viewing by the recipient and others. A teaser video may be sent prior to the cut-off date for participation to enhance the anticipation of the recipient.

In certain embodiments, the user uploads a photo or other image via an interface such as a Flash based player interface. The user may upload image files in any system-supported format such as JPG, TIFF, PNG, and BMP formats. The user may also select to choose a file from a social media network, which the system typically facilitates through a connecting API. The uploaded image is stored on the Content Delivery Network server. The image can be positioned by drag and drop, as well as fine-tuned controls for moving left, right, up, down, zoom in, zoom out, and rotating the image in 90 degree increments. The final, positioned image is then placed in a template-based Flash video file. This video file has predetermined placement areas that are marked and tracked within the video file. Uploaded content elements (e.g. text, images) are mapped on the placement areas in the video file. Once images and text are uploaded and mapped to the placement areas, the user can view a preview of the video through the video player. (Video players are typically generated using means such as Flash or HTML5.) The video is then composited and saved as a new video file (e.g. Flash video file) that is set for streaming from the Video Management System, specifically from the content delivery network (e.g. Rackspace or Akamei CDN). The Video Management System typically includes the entire video processing system, from the Flash components to the CDN. The video may be composited using any operable means, which may include a system specific custom compositing engine based on Adobe's Open Source Media Framework Template Flash video files. An email is sent to the recipient with a link to follow to view the final composited video file. The video may be viewed using any operable means, including a system specific, custom video player based on Adobe's Open Source Media Framework. The system may utilize a server such as a Rackspace Content Delivery Network server for storing the uploaded user images and a video server for storage of the template video files and streaming of the final composited video files. Additionally, via SWF to MP4 Conversion Tools, the video file is typically encoded into an MP4 format for optional playback on mobile devices. In certain embodiments, HTML5 is used along with or instead of Flash to play audio and video within webpages and, for example, to construct and play videos provided by the system.

Additional customization options are available if an organizer or participant selects to give a digital gift card in addition to creation of a celebration video. Certain embodiments of the system provide options for a participant to take any of the following actions through interaction with the system:

1. Record a personal video message to announce the delivery of the gift. A video message is provided to the system either by recording via appropriate hardware and software on a computerized device (e.g. personal computer, laptop, tablet, mobile phone, smart phone, or other computerized device) operable for recording and electronically transferring video to the system, and/or by uploading a video already existing on a computerized device. This video message is typically combined with the video messages of other multiple participants that contribute to produce a video compilation that results in a teaser video or celebration video. Using video compilation tools, such as Flash or JavaScript in the prior art, and/or custom technologies, individual video clips are compiled or merged together to create one common video file. A known video file format includes SWF. Upon compilation of the video, it is stored to a file for consumer consumption, typically to a common, known format such as MP4. The video file is stored on a system server, such as a Content Delivery Network server, for playback to the recipient, organizer, participants, or other viewers. Participants may preview video recorded to-date, i.e. video recorded by prior participants thus far, as well as provide additional video content.

2. Record a personal audio message to announce the delivery of the gift. This audio message can be recorded via the microphone on the user's computer or via a toll free telephone number. Recorded audio is stored on a system server in any operable format and may be incorporated into video, sent to the recipient via electronic message, provided for listening via a link or audio player on the personalized webpage, or stored on an audio chip housed in a gift card holder.

3. Select to deliver the gift card to the recipient with a reveal animation video. Reveal animation videos are brief (for example, approximately 10 second) prerecorded animations that reveal what gift card is being given. The participant sending the gift card may select from a library of reveal animations, however, if no selection is made a standard, pre-selected animation may be used to announce the gift card being given.

Video messages may be presented to the gift recipient for viewing on a personalized webpage, as a video file attached to an electronic message such as email or text message, as a video file accessible through social media, or stored for viewing in a video playback device such as a video greeting card or video gift card holder. Notice of the video message to the gift recipient may be provided via electronic message, social media sites, or by arrival and viewing upon the video playback device. Reveal animation videos may be stored in a similar manner, presented in a similar manner and notice of reveal animation videos may be made in a similar manner as described above for teaser videos.

Audio messages may be presented to the gift recipient for listening on a personalized webpage, as an audio file attached to an electronic message such as email or text message, as an audio file accessible through social media, or stored for listening in an audio playback device such as an audio greeting card or audio gift card holder. Notice of the audio message to the gift recipient may be provided via electronic message, social media sites, or by arrival and viewing upon the audio playback device. In certain embodiments, the recorded audio is stored for playback on a Content Delivery Network server (e.g. Rackspace CDN) to enable access to the audio message online for listening.

The system interface receives payment information from the organizer such as credit card or other electronic payment information, typically utilizing a payment gateway API (e.g. PayPal® or Authorize.Net®) as well as billing and shipping addresses.

The system interface provides means for the organizer to invite other parties to participate in the celebration or event. Invitations may be sent via e-mail address or more generally by posts to social media sites. Based upon content uploaded or otherwise provided by the organizer, the system creates an invitation page displaying the recipient's name, images and text, and means for participants to make purchases and provide additional content. A celebration video, which may be selected by the organizer from pre-produced videos or may be created from a video template using participant content, may also be displayed upon the invitation page. Participants may suggest additional (prospective) participants to be invited by the organizer. The names and email addresses of the suggested participants (invitees) will be sent by the system in an email message to the organizer, alerting the organizer of these suggestions. The organizer may then log into the system to view these suggestions and deploy an invitation through the system to those suggested invitees they wish to invite.

Content provided by participants (participants include the organizer) may include messages entered as text, photographs or other images, and video or audio files. Content limits per participant may be preset by the system or may be determined and set by the organizer. Overall content limits, such as available video or audio file storage (whether calculated in time or bytes) are set by the system and generally determined by physical limitations of audio or video file circuit memory.

Content provided by participants, such as photos, may be uploaded from a participant personal computer or mobile device (iPod®, iPad®, mobile phone or similar devices) or may be obtained from social media cites referenced by participants, such as a participant Facebook® or Twitter® account/page, or photo sharing site, such as Flickr® or Instagram®. Video content is typically provided via file upload.

The system interface provides means, such as menus or lists, for participants to select and add a new gift card to the gifts to be provided to the gift recipient under the celebration. Gift card choices presented to the participants may be determined at least partially by information provided by the organizer such as recipient's favorite shopping, dining, and travel venues or providers.

The system may include selection criteria, such as the following, that is used by the system to construct a user profile that is used to select or generate special offers or to provide suggested gift card types or vendors to participants. Such criteria may be associated with the gift recipient and may include event type, age, gender, and geographical location.

Example 1

Event=Birthday
Age=14
Gender=Male
Interests=Gaming
Geographical Location=Chicago, Ill.
Coupon Offer=Electronic Arts Coupon for Gaming Example 2

Event=Baby Shower
Age=25
Gender=Female
Geographical Location=Minneapolis, Minn.
Coupon Offer=Enfamil Coupon for Formula Example 3

Event=House Closing
Age=26
Gender=Male
Geographical Location=Austin, Tex.
Coupon Offer=Clorox Coupon for Cleaning Supplies When such criteria is associated with a particular offer or offers, analytics, typically based on user input such as click-throughs, will be tracked and evaluated either via system algorithms or by system personnel for continual improvement of the criteria type and associated values. Selection criteria data is typically stored in a Relational Database (e.g., MySQL, Oracle, etc). PHP along with SQL is utilized to match special offers with selection criteria.

Following the cut-off date for participation, an email, text, social media message or similar electronic message is transmitted by the system to the recipient notifying the recipient of the celebration. If a text message or other message that typically does not support graphic content is used, a link is provided to a recipient personalized webpage. If an email or similar message capable of displaying graphic content is used, the message may include, in addition text, photos or other images (including images provided by participants) as well as the aforementioned link.

The personalized webpage is created by the system and serves as the main interface for interaction between the recipient and the system as well as a means for the organizer and participant, as well as third party vendors, to display messages and content. Links to e-gift cards or to details and descriptions regarding physical gift cards are typically provided on the personalized event webpage and may comprise graphic elements, such as representations of gift boxes, which the recipient may click on with a computer pointer and mouse (or similar means) to open and view the details and descriptions. Physical gift cards may be shown as drawings or photos and will give the recipient the option to view who the gift was from. Digital gift cards (also referred to as e-gift cards) are typically presented via animated video. Following the video, e-gift cards may then be printed or sent to a mobile device. In the case of a mobile device, the e-gift card will typically display a code on the mobile device screen that may be used to access and use the e-gift card to make a purchase. The system may present offers on the personalized event webpage from third party vendors such as discounts, coupons, special pricing and other incentives for using gift cards to purchase from certain manufacturers or within certain time spans.

The system interface provides means for the recipient to send thank you notes, either physical or electronic, to participants. In some embodiments, the recipient may customize thank you note content. In certain embodiments of the system, the recipient may record and/or upload a video or audio message for viewing by participants. Links to such videos, typically hosted on a system webpage, may be transmitted to participants via email or text message or similar means, or may be posted on social media sites.

Another embodiment of the invention includes a personalized webpage to facilitate travel-related gifting and sharing photos and travel-related details, such as travel itinerary, with others. The personalized webpage is addressed by a PURL created using user entered information. The PURL and personalized webpage may be created by any of several types of users including a traveler, a friend or relative of a traveler, or someone in the travel industry working with the traveler, such as travel agent booking a trip for the traveler.

The PURL-addressed personalized webpage may comprise a centralized resource for storing and presenting all details pertaining to a traveler's trip and may replace one or more travel confirmation numbers. All trip details may be entered, stored and presented on the personalized webpage for ready access by the traveler and others (participants). In addition, the personalized webpage may present one or more interfaces for participants to contribute monetarily to trip expenses, purchase gifts for the traveler from associated merchants or vendors, purchase hotel upgrades, book dinner reservations, pay for meals and excursion, upgrade airline or other travel tickets, and view and upload content.

The personalized webpage may also provide third party content pertaining to the trip such as flight information, weather information, and touring and activity suggestions. During or after the trip, the traveler may upload content such as text, audio, photos, and video to the personalize webpage for access by the traveler and for the traveler to share with others. In certain embodiments of a travel-related personalized webpage, options for creating online photo albums may be provided as well as options for purchasing photo prints, photo compact discs, and printed photo albums.

Travel-related personalized webpages and associated PURLs may be offered by parties in the travel industry such as travel agencies, cruise lines, airlines, hotels, theme parks, national and state parks, and federal and state tourism agencies. Travel-related personalized webpages and associated PURLs may include themes or otherwise be directed to occasions such as family vacations, honeymoons, anniversary trips, family travel such as for baptisms, and business-related travel.

It is to be understood that while certain forms of this invention have been illustrated and described, it is not limited thereto except insofar as such limitations are included in the following claims and allowable equivalents thereof.

What is claimed is:

1. A method for the production and distribution of a personalized webpage to enhance online gifting, the method comprising:
    receiving, at a computerized device via a graphical user interface, an occasion selection and recipient information associated with a recipient from an event organizer at an organizer computing device, the recipient information includes at least one of gender, age, location and preferences;
    receiving a user selection to create the gifting presentation;
    creating, at the computerized device, a personal uniform resource locator that includes at least a portion of the recipient information;
    creating, at the computerized device, a personalized webpage addressed by the personal uniform resource locator, wherein the personalized webpage comprises the graphical user interface including the occasion selection, the recipient information, and a personalized video comprising at least one image or text provided by the event organizer or a participant, wherein the at least one text or image is mapped and composited into predetermined placement areas of a video template to provide the personalized video;
    transmitting the personal uniform resource locator from the computing device to a participant computing device;
    when the personal uniform resource locator is entered through Internet-accessible software, displaying, at the participant computing devices, the webpage comprising the graphical user interface including the occasion selection and the recipient information via the Internet-accessible software;
    presenting to the event organizer or participant, via the graphical user interface, a first set of offers for gifts based on the recipient information;
    creating and continually updating a stored record of an event organizer or participant's purchases and click-through inputs associated with the first set of offers; and
    analyzing the stored record and offering, via the graphical user interface, a second set of offers based on the stored record receiving, by the graphical user interface, a selection of a gift from the offers for gifts,
    wherein the gift is a physical gift to be sent to the recipient along with a physical gift holder;
    storing the personalized video on a video playback device disposed on the physical gift holder; and
    making the personalized video accessible to the recipient on the personalized webpage.

2. The method of claim 1, wherein the stored record includes offered items purchased by the event organizer or participant and offered items viewed by the event organizer or participant.

3. The method of claim 2, further comprising receiving at least one of a gift card selection, a gift card dollar amount selection and a gift card delivery method selection.

4. The method of claim 1, further comprising notifying the recipient about the personalized webpage.

5. The method of claim 1, further comprising receiving a second set of identifying information comprising at least one of a closed celebration selection, an open celebration selection, a gift card holder selection, one or more gift card holder personalization option selections, and personalized content.

6. The method of claim 1, further comprising a second set of offers based on a theme or occasion.

7. The method of claim 6, wherein the theme or occasion are at least one of family vacations, honeymoons, anniversary trips, or business.

8. The method of claim 1, further comprising receiving a selection of a physical gift card holder.

9. The method of claim 8, further comprising receiving one or more physical gift card holder personalization option selections.

10. The method of claim 9, wherein the physical gift card holder personalization option selections comprise at least one of holders personalized with text, holders personalized with images, holders personalized with audio, and holders personalized with video.

11. The method of claim 1, further comprising receiving personalized content to be included in the personalized webpage.

12. The method of claim 11, where the personalized content is selected from the group consisting of text, image file, audio file, and video file.

13. The method of claim 4, further comprising notifying the recipient by at least one of a text message, an email message, an electronic message, and a social media network.

14. A system for the production and distribution of a personalized webpage to enhance online gifting, the system comprising:
  non-transitory computer-readable medium having a computer program stored thereon for execution by a processor, the computer program operable to provide to a user an electronic resource comprising a processor and memory generating a user interface associated with an ecommerce site comprising receiving an occasion selection and recipient information associated with a recipient from an event organizer;
  a personal uniform resource locator module, executing at the processor, where the personal uniform resource locator creates a personal uniform resource locator that includes at least a portion of the recipient information, the recipient information includes at least one of gender, age, location and preferences;
  where the portion of the recipient information is prepended to an existing uniform resource locator for the ecommerce site;
  a personalized webpage module, executing at the processor, to create and generate for display a personalized webpage addressed by the personal uniform resource locator, wherein the personalized webpage presents, via the user interface, the occasion selection, the recipient information, and a personalized video;
  a personalized video module, accessible via the user interface, to create the personalized video where the personalized video comprises at least one image or text provided by the event organizer or a participant, wherein the at least one text or image is mapped and composited into predetermined placement areas of a video template to provide the personalized video;
  a communication module, accessible via the user interface, to transmit the personal uniform resource locator from the computing device;
  an organizer computing device operated by the event organizer and configured to:
    present to the event organizer or participant, via the graphical user interface, a first set of offers for gifts based on the recipient information;
    create and continually update a stored record of an event organizer or participant's purchases and click-through inputs associated with the first set of offers; and
    analyze the stored record and offer, via the graphical user interface, a second set of offers based on the stored record;
  receive a selection of a gift from the offers for gifts,
  wherein the gift is a physical gift to be sent to the recipient along with a physical gift holder;
  receive a selection to store the personalized video on a video playback device disposed on the physical gift holder; and
  make the personalized video accessible to the recipient on the personalized webpage;
  a participant computing device operated by a participant;
  a recipient computing device operated by a recipient;
  wherein when the personal uniform resource locator is accessed by the recipient computing device, the personalized webpage including the occasion selection, the recipient information, and the personalized video are displayed at the recipient computing device via the user interface.

15. The system of claim 14, wherein the gifts are at least one of a hotel reservation, a travel booking, or trip expense.

16. The system of claim 15, wherein the event organizer or participant is a travel agent.

17. The system of claim 15, wherein the personalized video depicts an itinerary for the trip as the text or image and a video of a trip location.

18. The system of claim 14, wherein a time period is created for purchase of the gifts and a countdown is presented to the event organizer or participant counting down to a cut-off of the time period.

19. They system of claim 18, wherein an alert including a link to the personalized webpage is sent to the recipient when the time period has come to an end.

20. The system of claim 14, wherein the gift is a gift card.

* * * * *